US006778893B2

(12) United States Patent
Murakami et al.

(10) Patent No.: US 6,778,893 B2
(45) Date of Patent: Aug. 17, 2004

(54) CONTROL SYSTEM FOR CONSTRUCTION MACHINES

(75) Inventors: Taku Murakami, Yamato (JP); Megumi Murase, Kanagawa (JP); Tadashi Taninaga, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 53 days.

(21) Appl. No.: 09/951,403

(22) Filed: Sep. 14, 2001

(65) Prior Publication Data

US 2002/0032511 A1 Mar. 14, 2002

(30) Foreign Application Priority Data

Sep. 14, 2000 (JP) ....................................... 2000/281020
Aug. 30, 2001 (JP) ....................................... 2001/261502

(51) Int. Cl.[7] ................................................ G06F 19/00
(52) U.S. Cl. ............................. 701/50; 701/29; 701/33; 340/438
(58) Field of Search ............................. 701/29, 33, 50; 340/438, 439; 702/184, 58

(56) References Cited

U.S. PATENT DOCUMENTS 4,517,468 A * 5/1985 Kemper et al. ............... 290/52
4,985,857 A * 1/1991 Bajpai et al. ............... 702/184
5,010,487 A * 4/1991 Stonehocker ................ 701/29
5,132,920 A * 7/1992 Bellows et al. ............. 702/184
5,214,595 A * 5/1993 Ozawa et al. ................. 702/58
6,141,608 A * 10/2000 Rother ........................ 701/33

* cited by examiner

*Primary Examiner*—Gary Chin
(74) *Attorney, Agent, or Firm*—Varndell & Varndell, PLLC

(57) ABSTRACT

Abnormality can be judged accurately by considering information other than a sensor-detected value. Determination of an abnormality degree, namely an urgency degree, is enabled, and an abnormality can be processed accurately according to the determined result. Only information really useful is given to the side of an administrator, and the communications cost is suppressed. Server unit 11 of manufacturer 10 judges the abnormality degree of a construction machine on the basis of a combination of all or two of first to third construction machine information D1, D2, D3 collected. The server unit 11 of the manufacturer 10 ranks the abnormality degree of the construction machine in respective levels of Rank 1 (Normal), Rank 2 (Warning), Rank 3 (Abnormal) and Rank 4 (Emergency) on the basis of the number of occurred times of error codes collected for the unit time.

15 Claims, 34 Drawing Sheets

FIG.2(a)

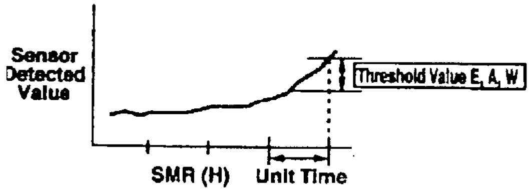

FIG.2(b)

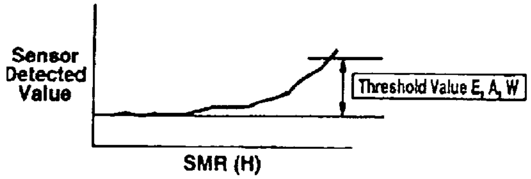

FIG.2(c)

| Trend Item | 1) Setting of Stepwise Simple Threshold Value | | | 2) Setting of Threshold Value by Inclination | | | | 3) Setting of Threshold Value by Increment From Initial Value | | | |
|---|---|---|---|---|---|---|---|---|---|---|---|
| | ·Number of Step | | ·Threshold Values | ·Unit Time | ·Number of Step | | ·Threshold Values | ·Definition of Initial Value | ·Number of Step | | ·Threshold Values |
| Blowby Pressure Pbb MAX | – | – | – | 100H | 3 | E<br>A<br>W | 500mm Aq or More<br>300mm Aq or More<br>150mm Aq or More | – | – | – | – |
| Engine Oil Temp. Toil MAX | 3 | E<br>A<br>W | 108deg.C or More<br>105deg.C or More<br>102deg.C or More | – | – | – | – | – | – | – | – |
| Engine Oil Pressure Poil MIN (Hi) | 3 | E<br>A<br>W | 1.5kg/cm² or Less<br>2.0kg/cm² or Less<br>4.0kg/cm² or Less | – | – | – | – | – | – | – | – |
| Engine Oil Pressure Poil MIN (Li) | 3 | E<br>A<br>W | 0.3kg/cm² or Less<br>0.4kg/cm² or Less<br>0.5kg/cm² or Less | – | – | – | – | – | – | – | – |
| Exhaust Temperature Tex MAX(1) Tex MAX(2) | – | – | – | – | – | – | – | Average Value in 1000H | 3 | E<br>A<br>W | 150deg.C or More<br>100deg.C or More<br>50deg.C or More |
| Fuel Production Rate Fuel Rate | – | – | – | 100H | 1 | W | ±30% or More | – | – | – | – |
| Fill Time Clutch Fill time 1st, 2nd 3rd 4th, High, Low | – | – | – | – | – | – | – | Average Value in 1000H | 3 | E<br>A<br>W | 40% or More<br>30% or More<br>20% or More |

E=Emergency
A=Abnormal
W=Warning
N=Normal

FIG.2(d)

| Error Code | Contents (Engine) | Detection Conditions (Logic) | Continuous Judging Time (s) | Historic Record of Failure | Setting of Snapshot | | |
|---|---|---|---|---|---|---|---|
| | | | | | Trigger | Priority | Multiple Storage |
| M220 | OVERRUN | Ne2700±40rpm or more | 1.0 | 1 | 1 | 1 | 0 |
| M240 | LOW ENG. OIL PRESS. | Oil pressure becomes less than the line connecting an oil pressure of 0.5kg/cm² at 730rpm and an oil pressure of 1.5 kg/cm² at 2000rpm | 1.0 | 1 | 1 | 1 | 0 |
| M241 | LOW ENG. OIL PRESS. | Oil pressure becomes 0.5kg/cm² or more in 15sec. after the engine start (Ne>300rpm) | 15 | 1 | 1 | 1 | 0 |

Emergency is produced when OVERRUN occurs 20 times or more in 100H (if not reached 100H, from the oldest)

| Setting of Error Occurrence Frequency | | | | |
|---|---|---|---|---|
| Unit Time (The Latest or Earlier) | 4 Emergency Count of Occurrence | 3 Abnormal Count of Occurrence | 2 Warning Count of Occurrence | 1 Normal Count of Occurrence |
| 100H | 20 | 15 | 5 | 1 |
| 500H | 5 | 3 | 1 | 1 |
| 100H | 1 | 1 | 1 | 1 |

FIG.3

Rank (Provisional):Downloaded Date:yy/mm/dd hh:mm:ss SMR:xx(H)

Trend Rank (Provisional):Totaling Period Date:yy/mm/dd-yy/mm/dd, SMR:xxx(H)-xx(H)

| Component | Item | SMR | Date | Value |
|---|---|---|---|---|
| Engine | Blowby Pressure | 10180 | 00/05/30 | 820 |
| Engine | Oil Temperature | 980 | 00/05/28 | 2 |
| TM | Fill Time | XXX | XXX | XXX |
| . . . | . . . | . . . | . . . | . . . |

| Conv Value | Judging Method | Rank | Explanation |
|---|---|---|---|
| 50.1 | Absolute Value | 3 | Blowby value is very high. |
| 2 | Inclination | 2 | Oil temperature tends to increase in 100H recently. |
| XXX | Absolute Value | 1 | Normal |
| . . . | . . . | . . . | . . . |

FIG.7

Error Code Rank (Provisional):Totaling Period Date:yy/mm/dd-yy/mm/dd, SMR:xxx

| Component | Code | Frequency | Rank | Explanation |
|---|---|---|---|---|
| Engine | E0000 | 10 | 2 | . . . |
| Engine | E0001 | 20 | 4 | Very many occurrences in 100H recently. |
| TM | T0000 | 0 | 1 | Normal |
| . . . | . . . | . . . | . . . | . . . |

FIG.8

| Model | Type | MV Co | Engine Type | Component | Item (data_id data_type) | Convert | Judging Method | Initial Value | Time $H_1$ | Time $H_2$ |
|---|---|---|---|---|---|---|---|---|---|---|
| D785 | 5 | — | SA12V140 | Engine | Blowby Pressure | 100 | Absolute Value | — | — | — |
| D785 | 5 | — | SA12V140 | Engine | Exhaust Temperature | 120.1 | Initial Value | 600 | — | — |
| D785 | 5 | — | SA12V140 | TM | . . . | XXX | Inclination | — | 100 | 200 |
| . . . | . . . | . . . | . . . | . . . | . . . | . . . | . . . | . . . | . . . | . . . |

| Rank | | | | | | | | | | | | | | | |
|---|---|---|---|---|---|---|---|---|---|---|---|---|---|---|---|
| 1 | | | | 2 | | | | 3 | | | | 4 | | | |
| Lower | | Upper | | Lower | | Upper | | Lower | | Upper | | Lower | | Upper | |
| Absolute Value | Explanation | Absolute Value | Explanation | Absolute Value | Explanation | Absolute Value | Explanation | Absolute Value | Explanation | Absolute Value | Explanation | Absolute Value | Explanation | Absolute Value | Explanation |
| — | — | 700 | Normal | — | — | 800 | Little High | — | — | 900 | Fairly High | — | — | | Very High |
| — | — | 30 | Normal | — | — | 50 | Little High | — | — | 70 | Fairly High | — | — | | Very High |
| — | — | 1 | Normal | — | — | 1.5 | Little Increase | — | — | 2 | Fairly Increase | — | — | | Considerable Increase |
| . . . | . . . | . . . | . . . | . . . | . . . | . . . | . . . | . . . | . . . | . . . | . . . | . . . | . . . | . . . | . . . |

FIG.10

| Model | Type | MV Co | Engine Type | Component | Error Code | Time (H) | Rank | | | | | | | |
|---|---|---|---|---|---|---|---|---|---|---|---|---|---|---|
| | | | | | | | 1 | | 2 | | 3 | | 4 | |
| | | | | | | | Frequency | Explanation | Frequency | Explanation | Frequency | Explanation | Frequency | Explanation |
| D785 | 5 | — | SA12V140 | Engine | E00001 | 100 | 5 | Normal | 10 | Little Many | 20 | Fairly Many | 30 | Very Many |
| D785 | 5 | — | SA12V140 | Engine | E00004 | 100 | 1 | Normal | 1 | Little Many | 1 | Fairly Many | 1 | Very Many |
| D785 | 5 | — | SA12V140 | TM | E00012 | 100 | XX | Normal | XX | Little Many | XX | Fairly Many | XX | Very Many |
| . . . | . . . | . . . | . . . | . . . | . . . | . . . | . . . | . . . | . . . | . . . | . . . | . . . | . . . | . . . |

FIG.11

| What Is Measurable | | | Cause | Result | | | |
|---|---|---|---|---|---|---|---|
| Item | | Phenomenon | | Rank 1 | Rank 2 | Rank 3 | Rank 4 |
| Onboard D1 | Blowby Pressure | Sharp Increase (Change of Tendency) | Horizontal Shaking of Offset Crosshead | Valve Guide Worm Away | | Valve Broken<br>Piston Broken | Metal Seizing |
| | Exhaust Temperature | Increase from Initial Value | | | Sealing Property Deteriorated | | |
| Oil Analysis D2 | Fe | Increase | | Valve Guide Worm Away | | | |
| | Si | Increase | Intake Piping Broken | Dust Mingled | | | |

FIG.14

Situation of Usage

| | | |
|---|---|---|
| Section | | |
| Gradient (Degree) ⟨Start of Loading⟩ | | |
| ☆Graph the Gradient and Enter Numerical Values. | | |
| Distance (m) | | |
| Radius of Curve | | |
| Time (Minute, Second) | | |
| Vehicle Speed (km/h) | | |
| Engin Speed (rpm) | | |
| T/M Speed Stage | | |
| Retarder Brake Using Section Use of Foot Brake | | |
| Evaluation of Road Surface | Attention 1 | |
| | Attention 2 | |
| | Attention 3 | |
| | Attention 4 | |
| | Total | |
| Calculation | W: Gloss Vehicle Weight(kg) | |
| | L: Section Distance (m) | |
| | α: \|SIN+μ\| | |
| | K= W×L×α | |
| | Course Load Factor | $P_w$: Rated Power (PS)<br>t: Cycle Time (minute)<br>Lf=(60×100)/(75×$p_w$×t×3600)×ΣK= ———— = |

FIG.18

| | New | Rank 4 | Rank 3 | Rank 2 | Rank 1 |
|---|---|---|---|---|---|
| Oil Analysis D2 | 5 | 5 | 0 | 0 | 0 |
| Onboard D1 | 11 | 3 | 8 | 0 | 0 |
| Inspection D3 | 9 | 2 | 7 | 0 | 0 |

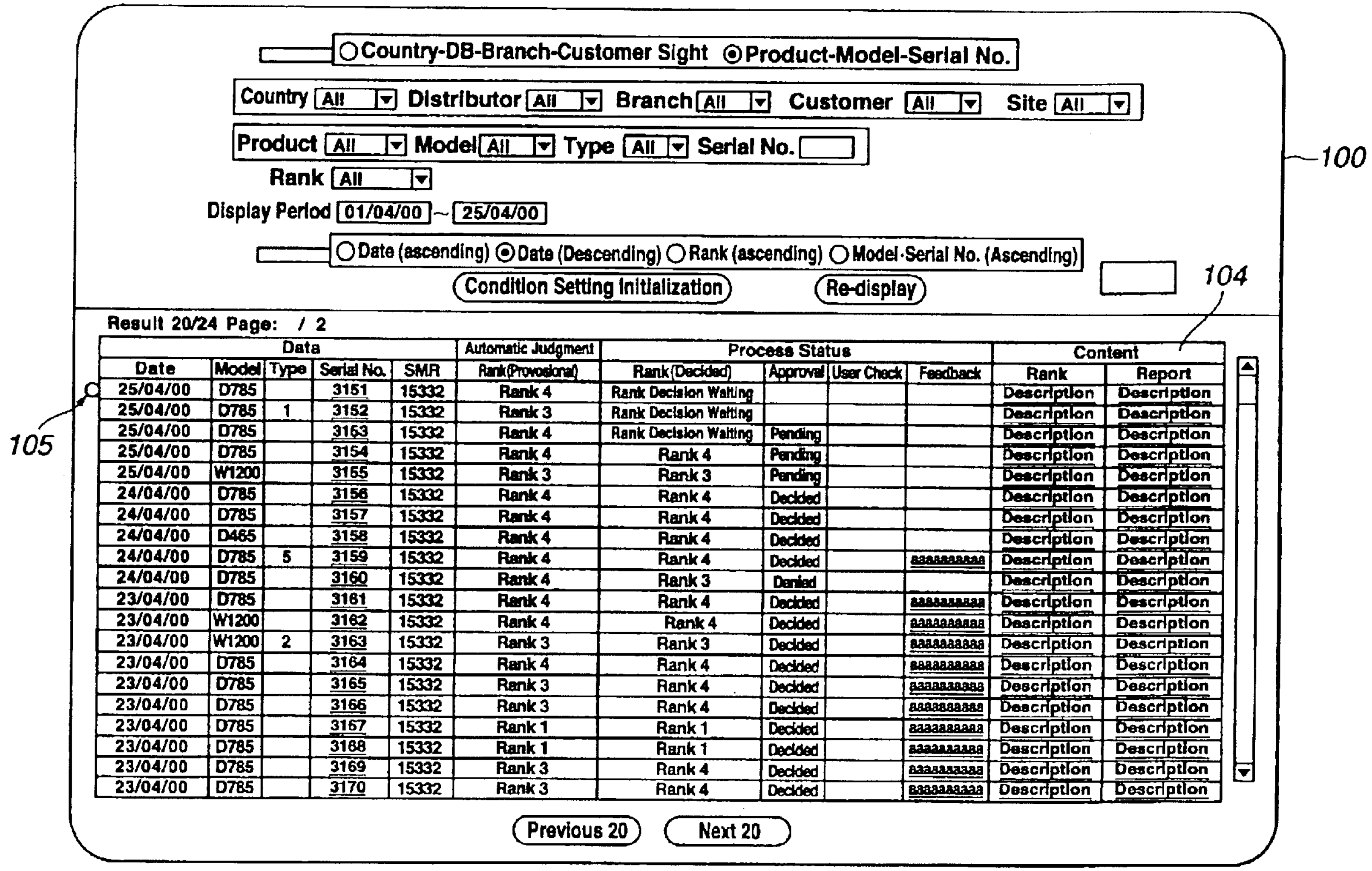

| Data | | | | | Automatic Judgment | Process Status | | | | Content | |
|---|---|---|---|---|---|---|---|---|---|---|---|
| Date | Model | Type | Serial No. | SMR | Rank(Provisional) | Rank(Decided) | Approval | User Check | Feedback | Rank | Report |
| 25/04/00 | D785 | | 3151 | 15332 | Rank 4 | Rank Decision Waiting | | | | Description | Description |
| 25/04/00 | D785 | 1 | 3152 | 15332 | Rank 3 | Rank Decision Waiting | | | | Description | Description |
| 25/04/00 | D785 | | 3153 | 15332 | Rank 4 | Rank Decision Waiting | Pending | | | Description | Description |
| 25/04/00 | D785 | | 3154 | 15332 | Rank 4 | Rank 4 | Pending | | | Description | Description |
| 25/04/00 | W1200 | | 3155 | 15332 | Rank 3 | Rank 3 | Pending | | | Description | Description |
| 24/04/00 | D785 | | 3156 | 15332 | Rank 4 | Rank 4 | Decided | | | Description | Description |
| 24/04/00 | D785 | | 3157 | 15332 | Rank 4 | Rank 4 | Decided | | | Description | Description |
| 24/04/00 | D465 | | 3158 | 15332 | Rank 4 | Rank 4 | Decided | | | Description | Description |
| 24/04/00 | D785 | 5 | 3159 | 15332 | Rank 4 | Rank 4 | Decided | | aaaaaaaaaa | Description | Description |
| 24/04/00 | D785 | | 3160 | 15332 | Rank 4 | Rank 3 | Denied | | | Description | Description |
| 23/04/00 | D785 | | 3161 | 15332 | Rank 4 | Rank 4 | Decided | | aaaaaaaaaa | Description | Description |
| 23/04/00 | W1200 | | 3162 | 15332 | Rank 4 | Rank 4 | Decided | | aaaaaaaaaa | Description | Description |
| 23/04/00 | W1200 | 2 | 3163 | 15332 | Rank 3 | Rank 3 | Decided | | aaaaaaaaaa | Description | Description |
| 23/04/00 | D785 | | 3164 | 15332 | Rank 4 | Rank 4 | Decided | | aaaaaaaaaa | Description | Description |
| 23/04/00 | D785 | | 3165 | 15332 | Rank 3 | Rank 4 | Decided | | aaaaaaaaaa | Description | Description |
| 23/04/00 | D785 | | 3166 | 15332 | Rank 3 | Rank 4 | Decided | | aaaaaaaaaa | Description | Description |
| 23/04/00 | D785 | | 3167 | 15332 | Rank 1 | Rank 1 | Decided | | aaaaaaaaaa | Description | Description |
| 23/04/00 | D785 | | 3168 | 15332 | Rank 1 | Rank 1 | Decided | | aaaaaaaaaa | Description | Description |
| 23/04/00 | D785 | | 3169 | 15332 | Rank 3 | Rank 4 | Decided | | aaaaaaaaaa | Description | Description |
| 23/04/00 | D785 | | 3170 | 15332 | Rank 3 | Rank 4 | Decided | | aaaaaaaaaa | Description | Description |

FIG.25

115

| | | | | | | Machine Down | Measurement Information | | | Action |
|---|---|---|---|---|---|---|---|---|---|---|
| | | | | | | | D1 | D3 | D2 | Bottleneck In Process |
| D785 | 12345 | Australia | Alcoa | 2000/6/4 | 9040 | ○(Rank 1) | ○(Rank 1) | ○(Rank 1) | Warning | |
| D785 | 12346 | Australia | Alcoa | 2000/6/4 | 9041 | ○(Rank 1) | ○(Rank 1) | ○(Rank 1) | ○(Rank 1) | |
| W1200 | 12345 | Australia | Alcoa | 2000/3/25 | 1230 | ○(Rank 1) | ○(Rank 1) | ○(Rank 1) | ○(Rank 1) | |
| D785 | 4006 | Japan | Kansai | 2000/3/22 | 3300 | ○(Rank 1) | Warning | ○(Rank 1) | Warning | |
| D785 | 4007 | Japan | Kansai | 2000/6/4 | 3400 | ○(Rank 1) | ○(Rank 1) | Warning | ○(Rank 1) | |
| W1200 | 12345 | Australia | BHP | 2000/6/4 | 1800 | ○(Rank 1) | ○(Rank 1) | ○(Rank 1) | ○(Rank 1) | |
| W1200 | 12346 | Australia | BHP | 2000/3/24 | 1350 | × | Abnormal | ○(Rank 1) | Warning | Waiting for Parts |
| P1800 | 12345 | Spain | ××× | 2000/3/26 | 2900 | ○(Rank 1) | ○(Rank 1) | ○(Rank 1) | ○(Rank 1) | |

FIG.30

Machine Management 100

Machine Information

Product : Dump Truck [M]  Model : D785-5
Serial No : 11111  Engine Type : SA12V140

Machine Spec  Site Info.  Customer Info.  DB Info.

Summary Status

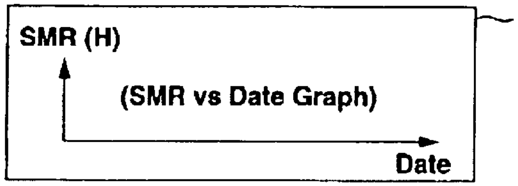

120

0-10000H ▿
SMR ▿

Data Log

| Date | SMR (H) | Action | Temporary Rank | Decided Rank | Remarks |
|---|---|---|---|---|---|
| 00/02/01 | 12000 | D1 | Rank 2 | Rank 1 | Trend |
| 00/01/01 | 11000 | D1 | Rank 1 | | Trend |
| 99/12/01 | 1000 | D2 | Rank 1 | Rank 1 | |
| 99/11/01 | 9500 | D2 | Rank 2 | Rank 2 | |
| 99/10/01 | 9000 | D1 | Rank 3 | | |
| 99/09/01 | 8000 | D2 | Rank 1 | Rank 1 | |
| 99/08/01 | 7500 | D1 | Rank 1 | Rank 1 | Repair Turbo |
| 99/07/01 | 6000 | Repair | | | |
| 99/06/01 | 5000 | D3 | Rank 1 | Rank 1 | |

121

Result XX/XXX Page 123  Back 20  Next 20  Custom Setting  Onboard Request

Data View & Analysis

Trend : Onboard  Trend : PM Clinic  Trend : Oil Analysis  Trend : KUC
Map  Error Code & Snapshot  Repair History
Analysis of Usage  Daily Report of Production Amount TOP  Return to main menu  Return to monitor screen

FIG.33

CONTROL SYSTEM FOR CONSTRUCTION MACHINES

BACKGROUND OF THE INVENTION

1. Field of the Invention

The present invention relates to a system for controlling construction machines by judging an abnormality such as a failure of the construction machines and processing the abnormality, such as repairing, according to the judged result.

2. Description of the Related Art

Construction machines such as hydraulic excavators, dump trucks, bulldozers and wheel loaders are often operated continuously at a worksite in order to complete the construction within the construction term demanded by a contractor. Therefore, where a construction machine has an abnormality such as a failure, it is necessary to quickly make a repair or the like to make downtime as short as possible. Besides, it is difficult to provide an alternative construction machine into the worksite immediately because the construction machine costs high, its models and quantity kept in a motor pool and the models and quantity to be rent are limited.

At present, the construction machines require substantially the same maintenance cost (parts cost, wages, etc.) as the initial selling price, making the maintenance cost high.

Therefore, it is necessary to make an early and accurate judgment about an abnormality such as a failure which occurs in a construction machine and to make arrangements for parts soon and to repair swiftly, in order to reduce the maintenance cost and to improve the rate of operation at a construction site. For example, the maintenance cost can be reduced and the repair time can also be made short by properly changing or adjusting appropriate parts before the engine is heavily damaged.

Accordingly, it is conventional for a maintenance person (maintenance person) to go to the construction machine to visually check it or to connect a personal computer to it so to download data related to the construction machine written into the memory within the construction machine, thereby obtaining information (service meter's clocking value, fuel consumption, engine speed, etc.) about the construction machine. Data collected from a plurality of construction machines are stored in the memory of the computer in Administration Department of a manufacturer of the construction machines to control the plurality of construction machines.

But, the aforesaid method has a disadvantage that collection of information is troublesome and an efficiency of collecting information is not good as the number of construction machine increases because information is collected manually.

Recently, it is seen in Japanese Patent Application Laid-open No. 8-144312 (hereinafter called the first publication) and Japanese Patent Application Laid-open No. 11-144312 (hereinafter called the second publication) that it is attempted to obtain information about construction machines automatically by communications means without depending on people.

The invention described in the first publication sends detected data of an operating state of a construction machine, an error code based on the detected data and an error code based on a visual inspection to Management Division of a manufacturer or the like through a communications device to show the error codes on a display screen on the side of Management Division, so that the abnormality of the construction machine is determined by a person, and a repair or the like is asked to a maintenance person.

Meanwhile, the second publication temporarily stores an error code based on the detected data of an operating state of a construction machine, and detected data immediately before the error code, namely snapshot data, into the memory mounted in the construction machine, sends the data stored in the memory to Management Division of a manufacturer or the like through a communications device, automatically judges the abnormality of the construction machine on the side of Management Division in view of the error code and the snapshot data, and requests a repair or the like to a maintenance person if the construction machine is judged abnormal.

According to the invention described in the first embodiment, the abnormality is judged depending on a person. Therefore, it has a disadvantage that the judgment is variable.

According to the invention described in the second publication, it does not have a disadvantage that the judgment is variable. But, because the abnormality is judged based on the error code and the snapshot data only, the judgment may not be made accurately. In other words, the error code and the snapshot data are data obtained from the detected values by the sensors disposed in the construction machine. But, the abnormality in the construction machine can be determined for the first time by combining the sensor-detected values, the visually checked results and the results of analyzing oil, etc.

Therefore, it is a first object of the present invention to enable an accurate judgment of the abnormality by adding information other than the sensor-detected values.

According to the inventions described in the first and second publications, the occurrence of an error code is basically judged that an abnormality has occurred.

But, the error code does not always mean an actual abnormality. In other words, the error code is generated by a controller within the construction machine. The controller is produced according to specifications so that it generates an error code even if the abnormality is minor in order to improve safety. For example, it is assumed that a construction machine has an overrun on a downward slope or the like. In this case, whenever the engine speed has over-revolutions, an error code indicating the overrun is generated even if the abnormality such as an engine damage or a brake damage has not occurred. And, it often happens that Management Division judges from the error code that there is an abnormality, and dispatches a maintenance person to the site, but the abnormality is not so serious as to require an urgent repair.

Conversely, when it is specified to generate an error code only when an abnormality actually occurs, the generation of the abnormality is not found previously, and the construction machine must be repaired after its breakdown, probably resulting in large downtime.

As described above, the prior art judges univocally whether there is an abnormality or not, so that is has disadvantages that a state with low urgency is judged abnormal and a state with high urgency is overlooked.

Therefore, it is a second object of the present invention to enable the judgment of an abnormality degree, namely a degree of urgency, and to enable proper processing of the abnormality according to the judged result.

The inventions described in the first and second publications judge an abnormality on the basis of information about a construction machine on the side of Management Division of a manufacturer or the like, and when it is judged abnormal, dispatches a maintenance person to the site to make a repair. In other words, the judged result as abnormal is information useful not only for Maintenance Division which makes a repair but also for Management Division, Sales Division and Production Division. Besides, abnormality-judging levels are different among Maintenance Division, Management Division, Sales Division and Production Division. For example, Maintenance Division needs to rush to the site to check an abnormality of a construction machine before the occurrence of a failure. Therefore, Maintenance Division needs information about even a slight abnormality. For Production Division, information about a miner abnormality is not significant but information about an abnormality with some seriousness is important because Production Division has to make a design change or the like. Management Division needs information about an abnormality having high possibility. Conversely, Maintenance Division may not make a repair quickly if information is limited to a serious abnormality. For Management Division, information about a minor abnormality is useless, and useful information might be disregarded as a result.

Thus, the level of information requested by the sides administering the construction machines is variable, and even if all information are given the administrators, such information cannot be used usefully but become useless depending on the levels of the administrators.

Transmission of all information univocally without sorting them results in increasing the communications cost.

Therefore, it is a third object of the present invention to give information which is really useful to the administrator and to reduce the communications cost.

According to the second publication, an abnormality of the construction machine is automatically judged.

But, it happens that what is judged abnormal is actually not abnormal, or what is not judged abnormal is actually abnormal. It is because data required for judging is insufficient or the contents of data do not comply with the actual situation.

The expert knowledge and technical level are variable among the sides administering the construction machines. For example, a designer of a manufacturer has an expert knowledge about the construction machines, but the user such as a rental company in general does not have an expert knowledge about the construction machines.

Therefore, where the judged result is obtained automatically and sent to the designer of the manufacturer or the user, the designer of the manufacturer can finally judge on the basis of the own knowledge whether the automatically judged result is appropriate or not and can take appropriate measures, but the user does not have a sufficient expert knowledge and must trust the automatically judged result. If the "abnormal" judgment is wrong, the user expends a useless labor, and if the "not abnormal" judgment is wrong, there is a problem for the user that an appropriate step such as repairing is delayed.

The present invention was achieved in view of the aforesaid circumstances. And, it is a fourth object of the invention to enable to take appropriate measures by giving information appropriate to the technical level of the side administering the construction machines.

According to the inventions described in the first and second publications, the occurrence of an error code is basically judged as the occurrence of an abnormality.

But, the error code does not necessarily mean a real abnormality. For example, the construction machines such as a dump truck often operate in the same worksite. The construction machines operating in the same environment may generate an error code at the same time when the environment changes suddenly due to a sudden increase of the outside temperature and the sensor value reaches an abnormal value. Therefore, if the generation of an error code is judged as the abnormality of the construction machine, a change caused in all the construction machines due to a sudden change in environment is judged abnormal, and it might be different from the actual state.

Conversely, when a criterion for the generation of an error code is set to a high level to exclude a sudden change in environment, the occurrence of a real abnormality is not found previously, and it becomes necessary to repair after the construction machine suffers a breakdown, possibly resulting in large downtime.

Accordingly, it is a fifth object of the invention to make it possible to determine accurately whether the error code is generated due to a change in the environment or a real abnormality of the construction machine by comparing information obtained from a plurality of construction machines which are operating in the same environment.

SUMMARY OF THE INVENTION

In order to achieve the first object of the invention, the first aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

first information collecting means which are disposed within the construction machine and detect internal information to collect first construction machine information;

second information collecting means which analyze a subject to be analyzed taken from the construction machine to collect second construction machine information;

third information collecting means which collect third construction machine information by visually judging the construction machine; and abnormality degree judging means which judge an abnormality degree of the construction machine on the basis of a combination of all or two of the first to third construction machine information collected by the first to third information collecting means, wherein:

the abnormality of the construction machine is processed depending on the abnormality degree judged by the abnormality degree judging means.

The first aspect of the invention will be described with reference to FIG. 1.

According to the first aspect of the invention, inside information D1 (onboard information) is detected by a sensor group 41 disposed within construction machine 31 and collected as first construction machine information D1.

Oil analysis center 17 analyzes subject to be analyzed 310*a* (oil) taken from the construction machine 31 to collect second construction machine information D2 (oil analysis information).

A maintenance person collects third construction machine information D3 by visually judging the construction machine 31 through personal computer 19.

Server unit 11 of manufacturer 10 judges an abnormality degree of the construction machine on the basis of all or a combination of two of the first to third construction machine information D1, D2, D3 collected. Specifically, the abnormality degree is judged to be in which of a first stage to a fourth stage on the basis of the first construction machine information D1 indicating a blowby pressure and an exhaust temperature and the second construction machine information D2 indicating an oil analysis result (a mixed degree of iron Fe, and a mixed degree of silicon Si) as shown in FIGS. 2(*a*) and 2(*b*).

Thus, according to the first aspect of the invention, an abnormality can be judged accurately by adding information other than the sensor-detected value.

In order to achieve the second object, the second aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and information processing means which rank an abnormality degree of the construction machine in a plurality of levels on the basis of the construction machine information collected by the information collecting means, wherein:

the abnormality of the construction machine is processed on the basis of information indicating the abnormality degree ranked by the information collecting means.

The second aspect of the invention will be described with reference to FIG. 1.

Controller 40 of the construction machine 31 collects an error code which indicates an overrun for example.

And, the server unit 11 of the manufacturer 10 ranks the abnormality degree of the construction machine in each level of Rank 1 (Normal), Rank 2 (Warning), Rank 3 (Abnormal) and Rank 4 (Emergency) on the basis of the number of occurrences of the collected error code for the unit time.

The administrator of the construction machine 31 makes an inspection, a repair or the like of the construction machine on the basis of information indicating the ranked abnormality degree. Specifically, when the abnormality degree is in Rank 1 or Rank 2, a maintenance person can judge that it is not necessary to inspect or repair the construction machine 31, and when it is in Rank 3 or Rank 4, it can be judged for the first time that it is necessary to inspect or repair the construction machine 31.

Thus, according to the second aspect of the invention, the abnormality degree, namely the degree of urgency, can be judged, so that adequate processing of an abnormality can be made according to the judged result.

In order to achieve the second object, the third aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a single or plurality of terminal devices which are disposed on the side of an administrator who processes the abnormality of the construction machine, wherein:

the information collecting means, the terminal devices and a server unit are communicably connected by communications means;

information processing means which rank an abnormality degree in a plurality of levels on the basis of the construction machine information are disposed on the server unit;

the construction machine information collected by the information collecting means is sent to the server unit through the communications means;

the information processing means of the server unit rank the abnormality degree of the construction machine in a plurality of levels on the basis of the sent construction machine information; and the server unit responds to a request from the single or plurality of terminal devices and sends information indicating the ranked abnormality degree to the requested terminal device through the communications means.

The third aspect of the invention will be described with reference to FIG. 1.

According to the third aspect of the invention, the inside information D1 (onboard information) is detected by the sensor group 41 disposed within the construction machine 31 and collected as the first construction machine information D1.

The oil analysis center 17 analyzes the subject to be analyzed 310*a* (oil) taken from the construction machine 31 to collect the second construction machine information D2 (oil analysis information).

A maintenance person collects the third construction machine information D3 by visually judging the construction machine 31 through the personal computer 19.

The collected construction machine information D1, D2, D3 are sent to the server unit 11 of the manufacturer 10 through the communications means such as communications satellite 5.

For the collected construction machine information D1, D2, D3, the server unit 11 of the manufacturer 10 ranks the abnormality degree in each level of Rank 1 (Normal), Rank 2 (Warning), Rank 3 (Abnormal) and Rank 4 (Emergency).

In response to a request from terminal device 51, the server unit 11 sends information indicating the ranked abnormality degree to the requested terminal device 51 through the communications means such as the Internet 7.

Information about the ranked abnormality degree can be seen via the display screen of the terminal device 51 on the side of an administrator (maintenance person) of the construction machine 31, and it can be judged whether the construction machine 31 is checked, repaired or the like. Specifically, when the abnormality is in Rank 1 or Rank 2, the maintenance person can judge that it is not necessary to inspect or repair the construction machine 31, and when it is in Rank 3 or Rank 4, it can be judged for the first time that it is necessary to inspect or repair the construction machine 31.

Thus, according to the third aspect of the invention, the abnormality degree, namely the degree of emergency, can be judged, so that adequate processing of an abnormality can be made according to the judged result.

A fourth aspect of the invention relates to the second or third aspect of the invention, wherein the system is applied to control a plurality of construction machines, and the information processing means set a ranking criterion for each of the construction machines and rank for every construction machine according to the set criterion.

A fifth aspect of the invention relates to the second or third aspect of the invention, wherein the construction machine information is time-series data which is variable with the passage of time, and the information processing means rank an amount of change to an inclination, an absolute value or an initial value of the time-series data in a plurality of levels.

A sixth aspect of the Invention relates to the second or third aspect of the invention, wherein the construction machine information is an error code indicating an error occurred within the construction machine, and the information processing means rank a frequency of occurrence of the error code in a plurality of levels.

A seventh aspect of the invention relates to the second or third aspect of the invention, wherein the construction machine information is a compared result obtained by comparing an actual operating condition with a predicted value of an operating state of the construction machine, and the information processing means rank the compared result in a plurality of levels.

In order to achieve the third object, an eighth aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a plurality of terminal devices which are disposed on the side of an administrator who processes the abnormality of the construction machine, wherein:

the information collecting means, the plurality of terminal devices and a server unit are communicably connected by communications means;

the information processing means, which rank an abnormality degree in a plurality of levels on the basis of the construction machine information and associate a rank of the abnormality degree to be sent with the plurality of terminal devices, are disposed on the server unit the construction machine information collected by the information collecting means is sent to the server unit through the communications means;

the information processing means of the server unit rank the abnormality degree of the construction machine in a plurality of levels on the basis of the sent construction machine information and associate a rank of the abnormality degree to be sent with the plurality of terminal devices; and the server unit responds to a request from the terminal device and sends abnormality degree information of a corresponding rank to the requested terminal device through the communications means.

The eighth aspect of the invention will be described with reference to FIG. 1.

According to the eighth aspect of the invention, the inside information D1 (onboard information) is detected by the sensor group 41 disposed within the construction machine 31 and collected as the first construction machine information D1.

The oil analysis center 17 analyzes the subject to be analyzed 310*a* (oil) taken from the construction machine 31 to collect the second construction machine information D2 (oil analysis information).

A maintenance person collects the third construction machine information D3 by visually judging the construction machine 31 through the personal computer 19.

The collected construction machine information D1, D2, D3 are sent to the server unit 11 of the manufacturer 10 through the communications means such as the communications satellite 5.

For the collected construction machine information D1, D2, D3, the server unit 11 of the manufacturer 10 ranks the abnormality degree in each level of Rank 1 (Normal), Rank 2 (Warning), Rank 3 (Abnormal) and Rank 4 (Emergency). And, Ranks 1, 2, 3, 4 of the abnormality degree are corresponded with the terminal device 51, Ranks 1, 2, 3, 4 of the abnormality degree are corresponded with the terminal device 51 of the maintenance person, Ranks 3, 4 of the abnormality degree are corresponded with the terminal device 52 of a sales person, and Rank 4 of the abnormality degree is corresponded with the terminal device 53 of the management side.

In response to a request from the terminal devices 51, 52, 53, the server unit 11 sends information indicating the corresponding ranked abnormality degree to the requested terminal devices 51, 52, 53 through the communications means such as the Internet 7.

Therefore, information about Ranks 1, 2, 3, 4 of the abnormality degree can be seen via the display screen of the terminal device 51 on the side of the maintenance person. Even a minor abnormality which belongs to a normal range can be seen. Therefore, the maintenance person can rush to the site to check an abnormality of the construction machine 31 before the occurrence of an actual failure. A sales person can see only information about Ranks 3, 4 of the abnormality degree via the display screen of the terminal device 52 on the side of the sales person. Therefore, the sales person can see only information about a serious abnormality. And, the management can see information about only Rank 4 of the abnormality degree via the display screen of the terminal device 53 on the side of the management. Therefore, only information about high possibility of occurrence of a failure can be seen. Conversely, there is a possibility that a repair or the like cannot be made swiftly even if only information about Rank 3 or 4 indicating serious abnormality information is given to the terminal device 51 of the maintenance person. Meanwhile, even if all information about Ranks 1, 2, 3, 4 including information about a minor abnormality are given to the terminal device 53 on the side of the management, they are useless information, resulting in that useful information might be disregarded.

Information is sorted before transmission, and all information are not sent univocally, so that the communications cost can be reduced.

Thus, according to the eighth aspect of the invention, only information really useful for the management side of the construction machine can be given, so that the communications cost can be suppressed.

In order to achieve the third object, a ninth aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a plurality of terminal devices which are disposed on the side of an administrator who processes the abnormality of the construction machine, wherein:

the information collecting means, the plurality of terminal devices and a server unit are communicably connected by communications means;

information processing means, which processes into information according to a level of the administrator of the terminal device on the basis of the construction machine information, are disposed on the server unit;

the construction machine information collected by the information collecting means is sent to the server unit through the communications means;

the information processing means of the server unit processes the sent contraction machine information into information according to a level of the administrator of the terminal device; and the server unit responds to a request from the terminal device and sends the processed information according to a level of the administrator of the requested terminal device to the requested terminal device through the communications means.

The ninth aspect of the invention provides the same effect as the eighth aspect of the invention.

A tenth aspect of the invention relates to the ninth aspect of the invention, wherein the server unit resends the processed information when data about the reception of the processed information is not sent back from the requested terminal device within a predetermined period.

An eleventh aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a plurality of terminal devices which are disposed on the side of an administrator who processes the abnormality of the construction machine, wherein:

the information collecting means, the terminal devices and a server unit are communicably connected by communications means;

the server unit is provided with the information processing means which rank an abnormality degree in a plurality of levels on the basis of the construction machine information and storage means which rerank the rank of the abnormality degree made by the information processing means and store the reranked results;

the construction machine information collected by the information collecting means is sent to the server unit through the communications means;

the information processing means of the server unit rank the abnormality degree of the construction machine in a plurality of levels on the basis of the sent construction machine information;

the ranks of the abnormality degree made by the information processing means are reranked, and the reranked results are stored in the storage means; and the server unit sends information indicating the reranked abnormality degree to the respective terminal devices through the communications means.

The eleventh aspect of the invention will be described with reference to FIG. 1.

According to the eleventh aspect of the invention, the inside information D1 (onboard information) is detected by the sensor group 41 disposed within the construction machine 31 and collected as the first construction machine information D1.

The oil analysis center 17 analyzes the subject to be analyzed 310*a* (oil) taken from the construction machine 31 to collect the second construction machine information D2 (oil analysis information).

A maintenance person collects the third construction machine information D3 by visually judging the construction machine 31 through the personal computer 19.

The collected construction machine information D1, D2, D3 are sent to the server unit 11 of the manufacturer 10 through the communications means such as the communications satellite 5.

For the collected construction machine information D1, D2, D3, the server unit 11 of the manufacturer 10 ranks the abnormality degree in each level of Rank 1 (Normal), Rank 2 (Warning), Rank 3 (Abnormal) and Rank 4 (Emergency).

Besides, ranking of the abnormality degree is reranked, and the reranked result is stored in storage means 12.

And, the server unit 11 sends information indicating the reranked abnormality degree to the respective terminal devices through the communications means such as the Internet 7.

For example, it is assumed that the data reranked from Rank “4” to Rank “3” is sent to terminal device 61 of lease/rental company 60 using the construction machines 31, 32. Then, measures such as the dispatch of a maintenance person can be avoided, and a useless labor is reduced.

Conversely, it is assumed that data reranked from Rank “3” to Rank “4” is sent to the terminal device 61 of the lease/rental company 60 using the construction machines 31, 32. Then, measures such as the dispatch of the maintenance person can be taken immediately to take an appropriate step such as repair or the like, so that the occurrence of downtime due to a failure of the construction machine can be avoided.

A twelfth aspect of the invention is directed to a control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a plurality of terminal devices which are disposed on the side of an administrator who processes the abnormality of the construction machine, wherein:

the information collecting means, the terminal devices and a server unit are communicably connected by communications means;

the server unit is provided with information processing means which rank an abnormality degree in a plurality of levels on the basis of the construction machine information;

the construction machine information collected by the information collecting means is sent to the server unit through the communications means;

the information processing means of the server unit rank the abnormality degree of the construction machine in a plurality of levels on the basis of the sent construction machine information;

the server unit sends information indicating the ranked abnormality degree to a particular terminal device through the communications means;

the particular terminal device reranks the ranked abnormality degree for the sent information and sends to the server unit; and the server unit sends information indicating the reranked abnormality degree to the respective terminal devices through the communications means.

The twelfth aspect of the invention will be described with reference to FIG. 1.

According to the twelfth aspect of the invention, the inside information D1 (onboard information) is detected by the sensor group 41 disposed within the construction machine 31 and collected as the first construction machine information D1.

The oil analysis center 17 analyzes the subject to be analyzed 310*a* (oil) taken from the construction machine 31 to collect the second construction machine information D2 (oil analysis information).

The maintenance person collects the third construction machine information D3 by visually judging the construction machine 31 through the personal computer 19.

The collected construction machine information D1, D2, D3 are sent to the server unit 11 of the manufacturer 10 through the communications means such as the communications satellite 5.

For the collected construction machine information D1, D2, D3, the server unit 11 of the manufacturer 10 ranks the abnormality degree in each level of Rank 1 (Normal), Rank 2 (Warning), Rank 3 (Abnormal) and Rank 4 (Emergency).

Besides, the server unit 11 sends information indicating the ranked abnormality degree to particular terminal device 10*a* through the communications means.

The particular terminal device 10*a* reranks the ranking of the abnormality degree of the received information and sends it to the server unit 11, which in turn sends the information about the reranked abnormality degree to the respective terminal devices through the communications means such as the Internet 7.

For example, it is assumed that the data reranked from Rank "4" to Rank "3" is sent to the terminal device 61 of the lease/rental company 60 using the construction machines 31, 32. Then, measures such as the dispatch of a maintenance person can be avoided, and a useless labor is reduced.

Conversely, it is assumed that data reranked from Rank "3" to Rank "4" is sent to the terminal device 61 of the lease/rental company 60 using the construction machines 31, 32. Then, measures such as the dispatch of the maintenance person can be taken immediately to take an appropriate step such as repair or the like, so that the occurrence of downtime due to a failure of the construction machine can be avoided.

A thirteenth aspect of the invention relates to the eleventh or twelfth aspect of the invention, wherein:

- the plurality of terminal devices are ranked in a plurality of levels;
- the abnormality degree ranked by the information processing means of the server unit is reranked according to the levels of the terminal devices; and
- the server unit sends the information about the reranked abnormality degree according to the levels of the terminal devices to the corresponding terminal device through the communications means.

According to the thirteenth aspect of the invention, when it is judged by an expert that the rank "4 (Emergency)" is actually "3 (Abnormal)", this reranked data, namely "3 (Abnormal)", is sent to the terminal device 61 of the lease/rental company 60. And data before the reranking, namely "4 (Emergency)", is sent as it is to the terminal device 51 on the side of Maintenance Division.

Thus, a maintenance person can rush to the site to take measures so that the user operates the construction machine carefully. Therefore, downtime can be minimized because the construction machine can be operated until the maintenance person arrives. And, the maintenance person can rush to the site to check whether the expert's judgment is correct or not and report the result to the manufacturer. Thus, according to the thirteenth aspect of the invention, more appropriate measures can be taken as compared with the case of sending the reranked result to the respective terminal devices univocally.

A fourteenth aspect of the invention is directed to a control system for construction machines which collects information from a plurality of construction machines which operate in the same environment, judges an abnormality of the plurality of construction machines on the basis of the collected construction machine information, and processes the abnormality of the construction machines when they are judged abnormal to control the construction machines, comprising:

- information collecting means which collect the construction machine information; and
- abnormality judging means which select the same kind of information from the construction machine information collected by the information collecting means, compare a value indicated by the same type of information among the plurality of construction machines, and judge a construction machine having a particular value as abnormal, wherein:
- the construction machine which is judged as abnormal by the abnormality judging means is processed for its abnormality.

The fourteenth aspect of the invention will be described with reference to FIGS. 35(*a*) and 35(*b*).

The same kind of information, e.g., trend data of a blowby pressure, is selected from the construction machine information collected by information collecting means of construction machines 31*a*, 31*b*, 31*c*, and the values indicated by the same kind of information are compared among the plurality of construction machines 31*a*, 31*b*, 31*c*. And, the construction machine 31*a* indicating a peculiar value is judged to be abnormal. For example, the trend data of the construction machine 31*a* increases sharply from service meter value SMR1 as shown in FIG. 35(*a*). But, the trend data of the other construction machines 31*b*, 31*c* have the same tendency as the dump track 31*a* in terms of the "sharp increase from the service meter value SMR1". Thus, it is judged that the abnormality of the construction machine 31*a* results from a change in the environment of the worksite and a possibility that it is an abnormality peculiar to the construction machine 31*a* is low. And, it is finally determined that no abnormality has occurred, and the ranking is changed from "4 (Emergency)" to "3 (Abnormal)".

Conversely, where only trend data about the single construction machine 31*a* shows a tendency to increase sharply from the service meter value SMR1 and the other construction machines 31*b*, 31*c* do not have a tendency to increase sharply as shown in FIG. 35(*b*), it is judged that the abnormality of the construction machine 31*a* is highly possible to be an abnormality inherent in the construction machine 31*a*. It is finally judged that the abnormality of Rank 4 has occurred, and the ranking "4 (Emergency)" made by the server unit 11 is maintained.

As described above, according to the fourteenth aspect of the invention, by comparing information collected from a plurality of construction machines which operate in the same environment, it can be judged accurately whether the abnormality results from the environment or a real abnormality of the construction machine.

BRIEF DESCRIPTION OF THE DRAWINGS

FIGS. 2(*a*) to 2(*d*) are diagrams for illustrating threshold values used to judge an abnormality degree in the embodiment;

FIG. 3 is a diagram for illustrating threshold values used to judge abnormality degrees of error codes in a frequency per unit time;

FIG. 7 is a diagram showing an output example of the result obtained by judging an abnormality degree obtained according to trend data;

FIG. 8 is a diagram showing an output example of the result obtained by judging an abnormality degree obtained according to an error code;

FIG. 10 is a diagram showing an example of output of the result obtained by judging an abnormality degree obtained according to trend data for each model and component of a construction machine;

FIG. 11 is a diagram showing an example of output of the result obtained by judging an abnormality degree obtained according to an error code for each model and component of a construction machine;

FIG. 14 is a diagram showing a table to be used to judge an abnormality degree of an engine according to onboard information and oil analysis information;

FIG. 18 is a diagram showing contents of investigation made on usage of a dump truck;

FIG. 25 is a diagram showing an example of a display screen of the terminal device;

FIG. 30 is a diagram showing an example of a display screen of the terminal device;

FIG. 33 is a diagram showing an example of a display screen of the terminal device;

DESCRIPTION OF THE PREFERRED EMBODIMENTS

A control system for a construction machine to which the present invention pertains will be described below with reference to the accompanying drawings. It is assumed in the embodiments that the construction machines include hydraulic excavators, bulldozers, dump trucks, wheel loaders, cranes, graders, crushing machines, etc.

Figure 1:
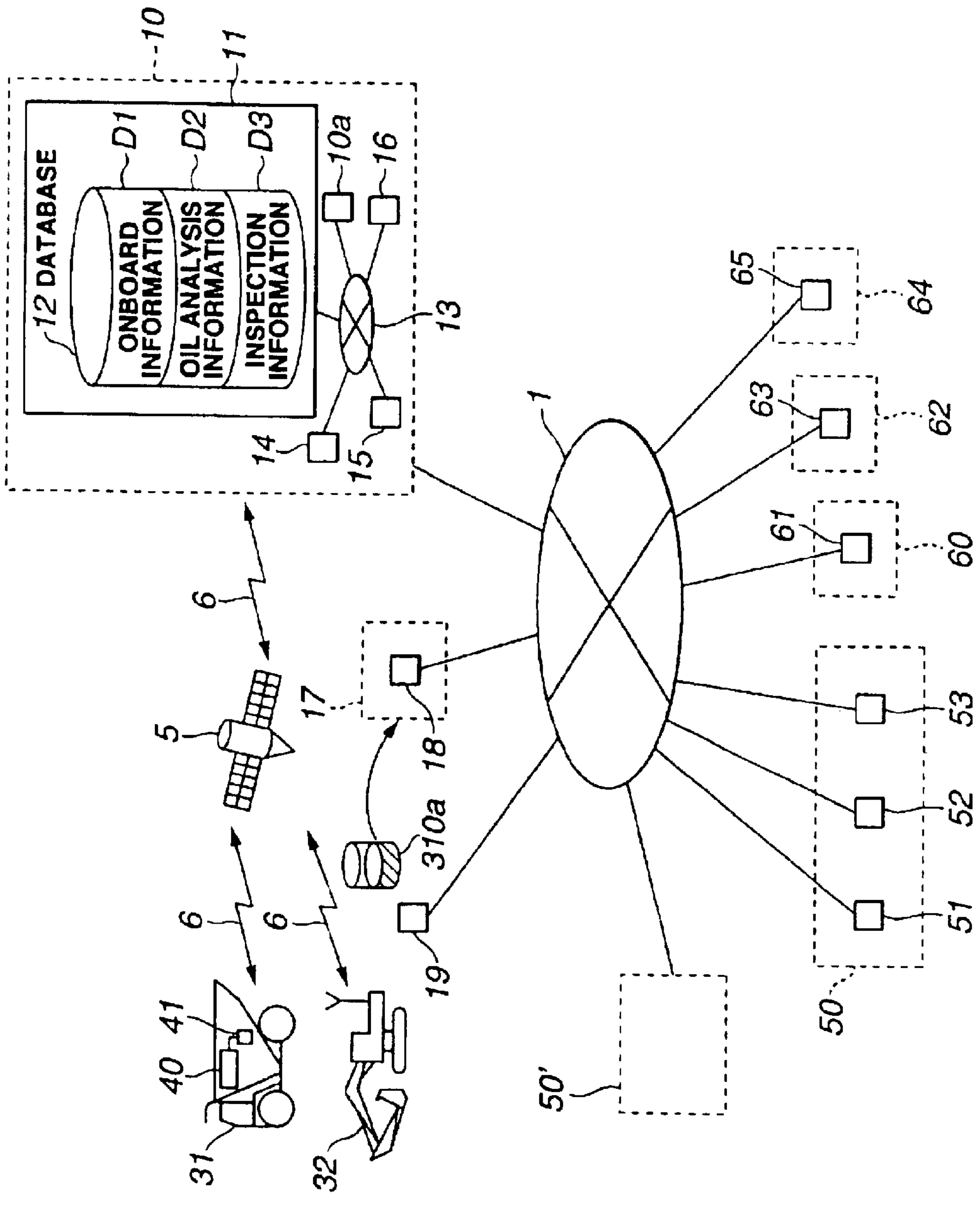
FIG. 1 is a diagram showing a general configuration of a control system for a construction machine of an embodiment.

FIG. 1 shows a control system for controlling the construction machines of the embodiments. In the embodiments, many construction machines manufactured by the construction machine manufacturer 10 are represented by 31 and 32.

First, a configuration and a communications form of the control system of FIG. 1 will be described.

As shown in FIG. 1, unshown communications terminal of the construction machines 31, 32, a plurality of terminal devices 14, 15, 16, 18, 19, 51, 52, 53, 61, 63, 65, and the server unit 11 are mutually connected communicably through communications devices such as the communications satellite 5, the Internet 7 and intranet 13. The Internet means a world wide communications network which communicably connects a plurality of LANs (local area networks) by gateways and bridges. The Internet provides services such as emails ("letters" sent or received through the Internet) and WWW (world wide web, which is an information retrieval system on the Internet). The intranet is a corporate internal communications network configured on the basis of the Internet technology.

The server unit 11 is disposed in the construction machine manufacturer head office 10 which provides services (hereinafter called the control information providing service) offered by the control system of the embodiment.

The server unit 11 is provided with database 12. The database 12 stores the construction machine information D1, D2, D3 to be described later for controlling the construction machines 31, 32 and a program for offering the control information offering service of the embodiment.

The respective terminal devices 14, 15, 16 are disposed in the manufacturer head office 10.

The terminal device 14 is disposed in Management Division of the manufacturer 10. The terminal device 15 is disposed in a factory of the manufacturer 10. The factory manufactures the construction machines 31, 32. The terminal device 16 is disposed in Sales Division of the manufacturer 10.

The server unit 11 and the terminal devices 14, 15, 16 are connected by the intranet 13 so to be able to send and receive mutually.

The server unit 11 and the respective terminal devices 18, 19, 51, 52, 53, 61, 63, 65 are connected by the Internet 7 so to be able to send and receive mutually.

The communications terminals of the construction machines 31, 32 and the server unit 11 are connected to be able to send and receive bidirectionally via the communications satellite 5. Communications are made through radio communications lines 6.

The server unit 11 controls input/output of data among the Internet 7, the communications satellite 5 and the intranet 13, and processes the data on the basis of the stored data D1, D2 and D3 in the database 12 into control information appropriate to monitor, make maintenance (inspection) or modify (repair) a state (damaged state) of the respective components configuring the construction machines 31, 32. The construction machines are configured of the respective components such as an engine, a transmission, a hydraulic pump, etc.

The terminal device 18 is disposed in the oil analysis center 17 where oil 310*a* (engine oil, transmission oil, torque converter oil, differential gear oil, brake oil, hydraulic oil for working machines, etc.) used for the construction machines 31, 32 is analyzed.

The terminal device 19 is a portable terminal device such as a portable personal computer carried by a maintenance person who inspects and repairs the construction machines 31, 32.

The terminal devices 51, 52, 53 are disposed at an agency 50 where the construction machines 31, 32 are sold and obtain services such as an inspection and a repair. The terminal device 51 is disposed in Maintenance Division of the agency 50. The terminal device 52 is disposed in Sales Division of the agency 50. The terminal device 53 is disposed in Management Division of the agency 50.

Agency 50' is an agency similar to the agency 50, an overseas corporation or the like. It is assumed that there are many agencies and local corporations at home and abroad to provide the same services such as selling and repairing construction machines as the agency 50 does. It is to be understood that the construction machines administered by the agency 50' are different from the construction machines 31, 32.

The terminal device 61 is disposed in the lease/rental company 60 which leases or lends the construction machines 31, 32. In this embodiment, the lease/rental company 60 is assumed to be an owner of the construction machines 31, 32.

The terminal device 63 is disposed in construction company 62 which uses the construction machines 31, 32 to do the excavation. In this embodiment, it is assumed that the construction company 62 does not use directly the construction machines 31, 32 but is responsible for the construction done by the construction machines 31, 32.

The terminal device 65 is disposed in office 64 at a construction site where the construction machines 31, 32 are actually used to do the construction. In this embodiment, it is assumed that the worksite office 64 is a user of the construction machines 31, 32.

The server unit 11 and the respective terminal devices 18, 19, 51, 52, 53, 61, 63, 65 are mutually linked to be able to send or receive on the Internet 7.

In the embodiment, it is to be understood that the management, a person in charge of the factory, and sales persons on the side of the respective terminal devices 14, 15, 16 of the manufacturer 10, maintenance persons, sales persons and the management on the side of the respective terminal devices 51, 52, 53 of the agency 50, employees on the side of the terminal device 61 of the lease company 60, a person in charge of construction (builder) on the side of the terminal device 63 of the construction company 62, a foreperson and operators on the side of the terminal device 65 of the worksite office 64 receive control information services provided by the server unit 11. The respective terminal devices 14, 15, 16, 18, 19, 51, 52, 53, 61, 63, 65 are provided with a display device to show control information provided by the server unit 11.

It is to be noted that the employees on the side of the terminal device 61 of the lease company 60, the person in charge of construction (builder) on the side of the terminal device 63 of the construction company 62, and the foreperson and the operators on the side of the terminal device 65 of the worksite office 64 are customers under the administration of the agency 50.

Then, a flow of information in the control system of FIG. 1 will be described.

Information about the construction machines 31, 32 broadly consist of onboard information D1, oil analysis information D2 and inspection information D3.

The onboard information D1 is information to be collected on the basis of values detected by various types of sensors 41 fitted to the construction machines 31, 32. The onboard information D1 includes trend data which is time-series data of the detected values of the sensors 41, error codes generated when the sensor-detected value reaches an abnormal value, frequency map data obtained on the basis of the values detected by the multiple types of sensors.

The sensor group 41 includes a service meter which detects clocking value SMR (engine operation time) of the service meter, a sensor which detects engine speed Ne, a sensor which detects a blowby pressure, a sensor which detects an exhaust temperature, a sensor which detects an oil temperature of an engine, a working machine, a transmission, etc., a sensor which detects an engine oil pressure and a hydraulic pump discharge pressure, a sensor which detects fill time required to engage a hydraulic clutch of the transmission of a dump truck, a payload meter which measures a load on a dump truck, etc. The fill time means a duration between the start of supplying a pressure oil required for engagement of the hydraulic clutch and the end of supplying.

Meanwhile, the oil analysis information D2 and the inspection information D3 are offboard information which cannot be obtained by the existing sensors 41 in the construction machines 31, 32.

The oil analysis information D2 is information to be collected by analyzing the oil 310*a* which is subject to analysis and taken out of the construction machines 31, 32. The oil analysis information D2 cannot be obtained unless the oil 310*a* is taken from the construction machines 31, 32, sent to the oil analysis center 17 and analyzed by a special analyzer.

The inspection information D3 is data which is collected by visually judging the measured values of special measuring equipment attached to the construction machines 31, 32 or by a direct visual inspection of each part of the construction machines 31, 32. The inspection information D3 cannot be collected unless a maintenance person goes to a construction site where the construction machines 31, 32 are present and visually check them. The inspection information D3 includes for example a worn or damaged state of wear-and-tear parts such as tires, a cracked or damaged state of a pipe such as a hose, an operating speed of the work machine, sounds produced by the respective components such as the engine, an exhausting state of the engine, etc.

The controller 40 in the construction machines 31, 32 collects and stores the onboard information D1 on the basis of the detected values of the sensor group 40. Specifically, the construction machines 31, 32 have therein the main controller 40 and other controllers linked on the daisy chain by a signal line so that they can make serial communications to configure an internal network. A frame signal having a predetermined protocol is sent through the signal line between the controllers in the construction machine body. When the frame signal is sent between the respective controllers, a drive signal is output to actuators (a hydraulic pump, governor, control valve, etc.) which are linked to the respective controllers according to data described in the frame signal, the actuators are controlled to drive, and detection data detected by the sensor group 41 connected to the respective controllers or data indicating information about the equipment inside are obtained and described in the frame signal. Thus, data about the detection signal of the sensor group 41 are taken into the controller 40 through the frame signal. When a detected value of a sensor reaches an abnormal value, an error code is produced. For example, when the blowby pressure has a level of the threshold value of a predetermined value or higher, an error code indicating that the blowby pressure is abnormally high is produced.

Transmission and reception are mutually made between the communications terminals of the construction machines 31, 32 and the server unit 11 by the radio communications lines 6 via the communications satellite 5. Thus, the onboard information D1 obtained in the construction machines 31, 32 is automatically sent periodically to the server unit 11 via the radio communications lines 6 and the communications satellite 5. For example, it is automatically sent every 20 hours at intervals of the clocking value SMR of the service meter. It is also sent automatically every day according to the clock built in the construction machines 31, 32. And, the onboard information D1 obtained within the construction machines 31, 32 can be sent back by radio in response to the request from the server unit 11 as described later. The onboard information D1 within the construction machines 31, 32 may be downloaded to the portable terminal device 19 and sent to the server unit 11 through the Internet 1.

The oil 310*a* is taken from the construction machines 31, 32 and sent to the oil analysis center 17. The oil analysis center 17 analyzes the oil 310*a* by a special analyzer and creates oil analysis information D2. The oil analysis information D2 is input from the terminal device 18 and sent to the server unit 11 through the Internet 1. The oil analysis information D2 can be collected by a maintenance person who goes to the construction machines 31, 32 to make a periodical oil exchange.

The inspection information D3 is collected by making a visual check of a special measuring device attached to the construction machines 31, 32 or by making a direct visual check of the respective parts of the construction machines 31, 32. The inspection information D3 is entered into the portable terminal device 19 which is carried by a maintenance person and sent to the server unit 11 through the Internet 1. The inspection information D3 can be collected by a maintenance person who goes to the construction machines 31, 32 to make a periodical inspection of the construction machines 31, 32.

The server device 11 processes data on the basis of the onboard information D1, the oil analysis information D2, and the inspection information D3 to create control information as described later.

Typical control information created by the server unit 11 is as follows. "Abnormality information" that the abnormality degrees of the construction machines 31, 32 are classified into four levels, namely Rank 1 (Normal), Rank 2 (Warning), Rank 3 (Abnormal) and Rank 4 (Emergency).

Abnormality information means that urgency requiring a repair or the like becomes higher as its rank becomes higher from Rank 1 toward Ranks 2, 3, 4. The abnormality information is created for each item, namely the blowby pressure, the exhaust temperature and the like, of the onboard information D1. And, the abnormality information is also created for each item, namely a content of iron Fe in the engine oil, a viscosity of the transmission oil and the like, of the oil analysis information D2. It is also created for each item, namely the tire abrasion, the work machine speed and the like, of the inspection information D3. An overall abnormality degree is also created in the same four levels for each of the construction machines 31, 32. The ranked abnormality information is periodically created by the server unit 11. For example, it is created every time when the onboard information D1 is received from the construction machines 31, 32.

The abnormality information is sent as email from the server unit 11 to each of the terminal devices.

"Periodical report" about a condition (state of damage) of the construction machines 31, 32.

It is information about summary contents of the onboard information D1, the oil analysis information D2 and the inspection information D3 for each of the construction machines 31, 32.

The database 12 of the server unit 11 stores web pages (data having a link structure configured of a series of pages linked subsequent to the head page and used in a sense as the information screen of the Internet 7 and the intranet 13) for processing such as retrieving control information, which has the onboard information D1, the oil analysis information D2 and the inspection information D3 processed, on the display screens of the respective terminal devices 14, 15, 16, 18, 19, 51, 52, 53, 61, 63, 65.

In response to requests from the respective terminal devices 14, 15, 16, 18, 19, 51, 52, 53, 61, 63, 65, the server unit 11 provides the contents stored in the database 12 to them and/or rewrites the stored contents of the database 12 according to data input from a predetermined terminal device. In other words, the web pages can be shown on the display screen of the terminal device to receive the control information-providing service by accessing the stored data of the database 12 from each of the respective terminal devices.

The respective terminal devices 14, 15, 16, 18, 19, 51, 52, 53, 61, 63, 65 can access to the periodical report stored in the database 12 of the server device 11 regardless of a rank of the abnormality information. But, only abnormality information at a particular rank is sent to a particular terminal device relative to the abnormality information which is allotted to each periodical report sent as email from the server unit 11.

For example, the abnormality information of Rank 4 is sent as email to the terminal device 14 on the part of Management Division and the terminal device 16 on the part of Sales Division of the manufacturer 10.

And, the abnormality information of Ranks 3 and 4 are sent as email to the terminal device 15 on the side of the factory of the manufacturer 10. The respective terminal devices 14, 15, 16 of the manufacturer 10 send the abnormality information about all construction machines 31, 32, . . . produced by the manufacturer 10 as email.

The abnormality information of Ranks 1 to 4 are sent as email to the terminal device 51 on the side of Maintenance Division of the agency 50.

The abnormality information of Ranks 3 and 4 are sent as email to the terminal device 52 on the side of Sales Division of the agency 50.

The abnormality information of Rank 4 is sent as email to the terminal device 53 on the side of Management Division of the agency 50. Abnormality information about the vehicles 31, 32 sold and administered by the agency 50 is sent as email to the terminal devices 51, 52, 53 of the agency 50.

Abnormality information of Ranks 2, 3, 4 are sent as email to the terminal device 61 of the lease company 60.

Abnormality information of Ranks 3, 4 are sent as email to the terminal device 63 of the construction company 62.

Abnormality information of Ranks 2, 3, 4 are sent as email to the terminal device 65 of the worksite office 64. Abnormality information about the vehicle 31 which is owned and administered by the customer is sent as email to the respective terminal devices 61, 63, 65 of the customer.

The periodical report may be limited in the same way as the abnormality information which is sent as email so that the access to a particular terminal device is limited to the periodical report of a particular rank. It can be realized under conditions that a particular ID number and a particular code number are input and a user approval key is used on the side of the terminal device. In other words, the particular terminal device is limited to show a particular page among the web pages and particular information on its display screen.

Then, processing of data performed by the server unit 11 will be described.

FIGS. 2(*a*) to 2(*d*) are diagrams illustrating processing of the onboard information D1 into abnormality information.

Time-series data of the sensor-detected value in the onboard information D1 will be called trend data.

FIG. 2(*d*) shows a relation between typical items of the sensor-detected values in the onboard information D1 and threshold values W, A, E for determining Ranks 1, 2, 3, 4 of the abnormality degree. FIGS. 2(*a*) to 2(*c*) are graphs of trend data having the service meter clocking value SMR (H) on the horizontal axis and the sensor-detected value on the vertical axis.

FIG. 2(*a*) shows the absolute value of the sensor-detected value divided into stepwise threshold values W, A, E. When the absolute value of the sensor-detected value is the threshold value W or more, it is judged that the abnormality degree is Rank 2, when the absolute value of the sensor-detected value is the threshold value A or more, it is judged that the abnormality degree is Rank 3, and when the absolute value of the sensor-detected value is the threshold value E or more, it is judged that the abnormality degree is Rank 4. For example, when the engine oil temperature is 102 deg. C. or higher as shown in FIG. 2(*d*), it is judged that the abnormality degree is Rank 2, when the engine oil temperature is 105 deg. C. or higher, it is judged that the abnormality degree is Rank 3, and when the engine oil temperature is 108 deg. C. or higher, it is judged that the abnormality degree is Rank 4. The method of judging the abnormality degree according to FIG. 2(*a*) will be called the judging method based on an absolute value of trend data.

FIG. 2(*b*) shows a difference (inclination of the trend data) of the sensor-detected values before and after the unit time divided into stepwise threshold values W, A, E. When a difference of the sensor-detected values before and after the unit time is the threshold value W or higher, it is judged that the abnormality degree is Rank 2, when a difference of the sensor-detected values before and after the unit time is the threshold value A or higher, it is judged that the abnormality degree is Rank 3, and when a difference of the sensor-detected values before and after the unit time is the threshold value E or higher, it is judged that the abnormality degree is Rank 4. For example, as shown in FIG. 2(*d*), when a difference of blowby pressures before and after the unit time 100H is 150 mmAq or more, it is judged that the abnormality degree is Rank 2, when a difference of blowby pressures before and after the unit time 100H is 300 mmAq or more, it is judged that the abnormality degree is Rank 3, and when a difference of blowby pressures before and after the unit time 100H is 500 mmAq or more, it is judged that the abnormality degree is Rank 4.

When the sensor-detected value last obtained has not elapsed the unit time 100H after starting to obtain the sensor-detected value, a difference between the oldest sensor-detected value and the latest sensor-detected value is taken to judge the abnormality degree. The method of judging an abnormality degree according to FIG. 2(*b*) will be called the judging method based on an inclination of trend data.

FIG. 2(*c*) shows an increment of the sensor-detected value relative to the initial value divided into stepwise threshold values W, A, E. When an increment of the sensor-detected value relative to the initial value is the threshold value W or higher, it is judged that the abnormality degree is Rank 2, when an increment of the sensor-detected value relative to the initial value is the threshold value A or higher, it is judged that the abnormality degree is Rank 3, and when an increment of the sensor-detected value relative to the initial value is the threshold value E or higher, it is judged that the abnormality degree is Rank 4. For example, as shown in FIG. 2(*d*), when an average value of the sensor-detected values with the service meter clocking value up to 1000H is determined as the initial value and an increment of the exhaust temperature relative to the initial value is 50 deg. C. or more, it is judged that the abnormality degree is Rank 2, when an increment of the exhaust temperature relative to the same initial value is 100 deg. C. or more, it is judged that the abnormality degree is Rank 3, and when an increment of the exhaust temperature relative to the same initial value is 150 deg. C. or more, it is judged that the abnormality degree is Rank 4. The method of judging an abnormality degree according to FIG. 2(*c*) will be called the judgment method based on an increment from the initial value of trend data.

Referring to FIG. 3, the method of judging an abnormality degree from an error code will be described.

FIG. 3 shows a relation between typical items of error codes in the onboard information D1 and the threshold value for determining Ranks 1, 2, 3, 4 of an abnormality degree.

As shown in FIG. 3, when an occurrence frequency of an error code for the unit time is a first threshold value or higher and less than a second threshold value, it is judged that the abnormality degree is Rank 1, when an occurrence frequency of an error code for the unit time is the second threshold value or higher and less than a third threshold value, it is judged that the abnormality degree is Rank 2, when an occurrence frequency of an error code for the unit time is the third threshold value or higher and less than a fourth threshold value, it is judged that the abnormality degree is Rank 3, and when an occurrence frequency of an error code for the unit time is the fourth threshold value or higher, it is judged that the abnormality degree is Rank 4.

For example, when engine speed Ne is continuously 2700 rpm±40 rpm for 1.0 second or more, an error code indicating "overrun" is produced. When the number of counted error codes indicating an overrun caused in the unit time 100H is 1 to 4, it is judged that the abnormality degree is Rank 1, when the number of counted error codes generated in the same unit time is 5 to 14, it is judged that the abnormality degree is Rank 2, when the number of counted error codes generated in the same unit time is 15 to 19, it is judged that the abnormality degree is Rank 3, and when the number of counted error codes generated in the same unit time is 20 or more, it is judged that the abnormality degree is Rank 4. When the error code last obtained has not elapsed the unit time 100H after starting to obtain the error code, the abnormality degree is judged according to the number of counts from the oldest error code obtained.

If no error code were generated at all, a judgment of an abnormality degree according to an error code is not made.

The aforesaid threshold value, initial value and unit time can be determined for each model, type, serial number of the construction machines 31, 32 and can also be determined to be different for each kind and form of the components. And, a "description" indicating an abnormality degree may be provided for each rank.

FIG. 10 shows setting examples of the threshold value, initial value and unit time of the trend data. As shown in FIG. 10, for example, "D785" is associated with the "model", "5" with the "type", "SA12V140" with the "engine type", an "engine" with the "component", a "blowby pressure" with the "item", the "judging method based on an absolute value of trend data" with the "judging method", "700" with the "threshold value of Rank 1", "normal" with the "description of Rank 1", "800" with the "threshold value of Rank 2", "little high" with the "description of Rank 2", "900" with the "threshold value of Rank 3", "fairly high" with the "description of Rank 3", and "very high" with the "description of Rank 4".

FIG. 11 shows an example of setting the threshold value and unit time of error code. As shown in FIG. 10, for example, "D785" is associated with the "model", "5" with the "type", "SA12V140" with the "engine type", the "engine" with the "component", "E00001" with the "error code", "100" with the "unit time", "5 times" with the "threshold value of Rank 1", "normal" with the "description of Rank 1", "10 times" with the "threshold value of Rank 2", "little many" with the "description of Rank 2", "20 times" with the "threshold value of Rank 3", "fairly many" with the "description of Rank 3", and "very many" with the "description of Rank 4".

Figure 4:
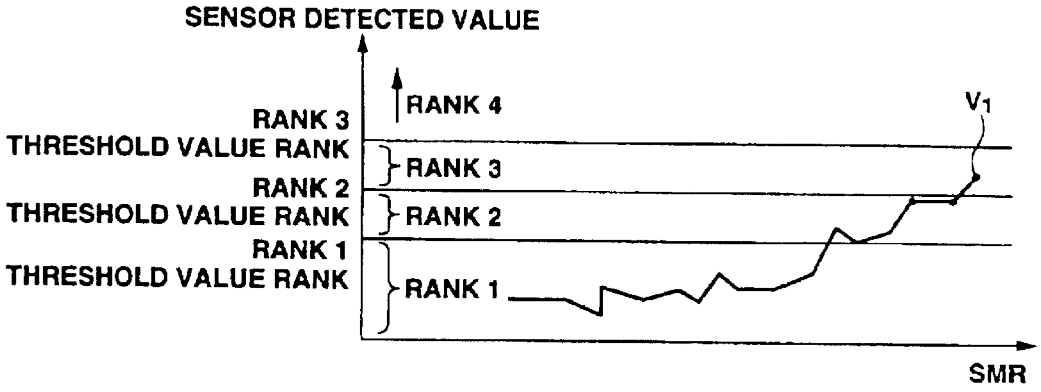
FIG. 4 is a graph of judging an abnormality degree according to an absolute value of trend data.

FIG. 4 shows an embodiment that the abnormality degree is judged according to the threshold value determined as shown in FIG. 2(*a*). As shown in FIG. 4, it is judged that the abnormality degree is Rank 3 when sensor-detected value v1 becomes the threshold value indicating Rank 2 or higher.

Figure 5:
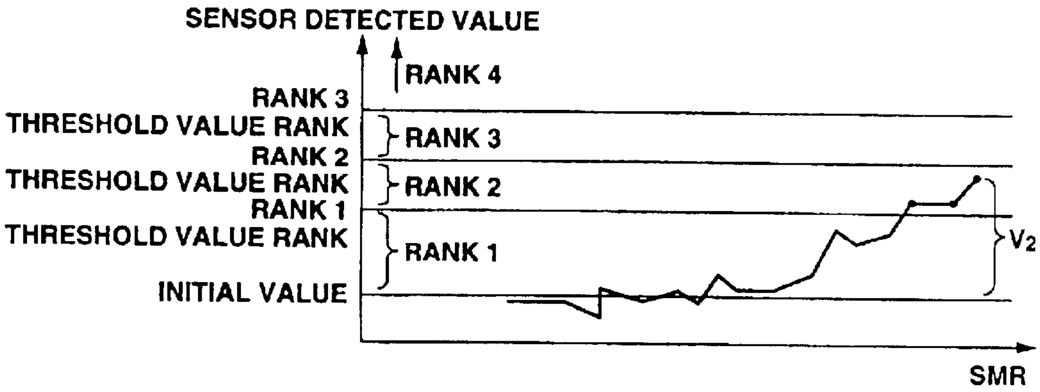
FIG. 5 is a graph of judging an abnormality degree according to an increment to an initial value of trend data.

FIG. 5 shows an embodiment that the abnormality degree is judged according to the threshold value determined as shown in FIG. 2(*c*). As shown in FIG. 5, it is judged that the abnormality degree is Rank 3 when increment v2 of the sensor-detected value relative to the initial value becomes the threshold value indicating Rank 3 or higher.

Figure 6:
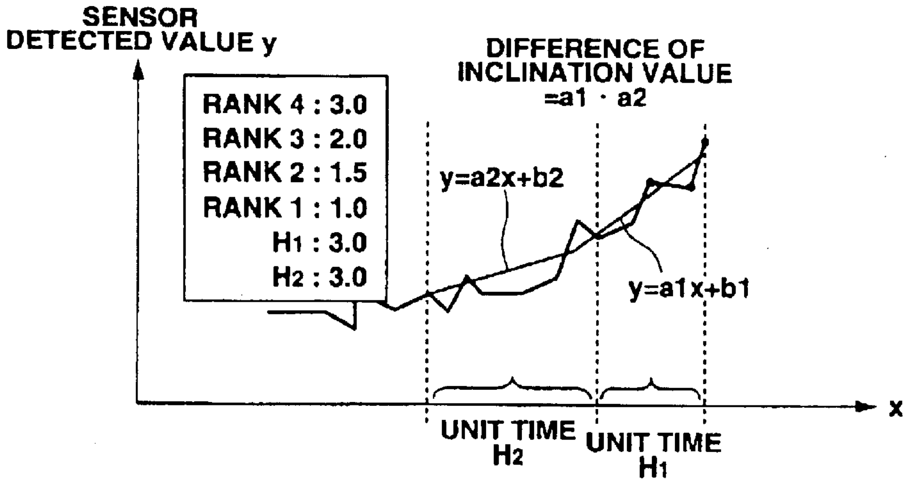
FIG. 6 is a graph of judging an abnormality degree according to an inclination of trend data.

FIG. 6 shows an embodiment that the abnormality degree is judged according to the threshold value determined as shown in FIG. 2(*b*). As shown in FIG. 6, the horizontal axis is x, and the vertical axis is y. Linear function y=a2+b2 indicating trend data in the unit time H2 is determined by the second recurrence. And, linear function y=a1+b1 indicating trend data in the next unit time H1 is determined by the second recurrence. A difference a1−a2 of inclinations of the linear functions is compared with the threshold value to judge an abnormality degree. For example, the threshold value for judging Rank 1 is set to 1.0, the threshold value for judging Rank 2 is set to 1.5, the threshold value for judging Rank 3 is set to 2.0, and the threshold value for judging Rank 4 is set to 3.0. The unit time H1 is set to 100H, and the unit time H2 is set to 200H. For example, when the inclination difference a1−a2 becomes the threshold value 1.5 or more indicating Rank 2, it is judged that the abnormality degree is Rank 2.

Figure 12A:
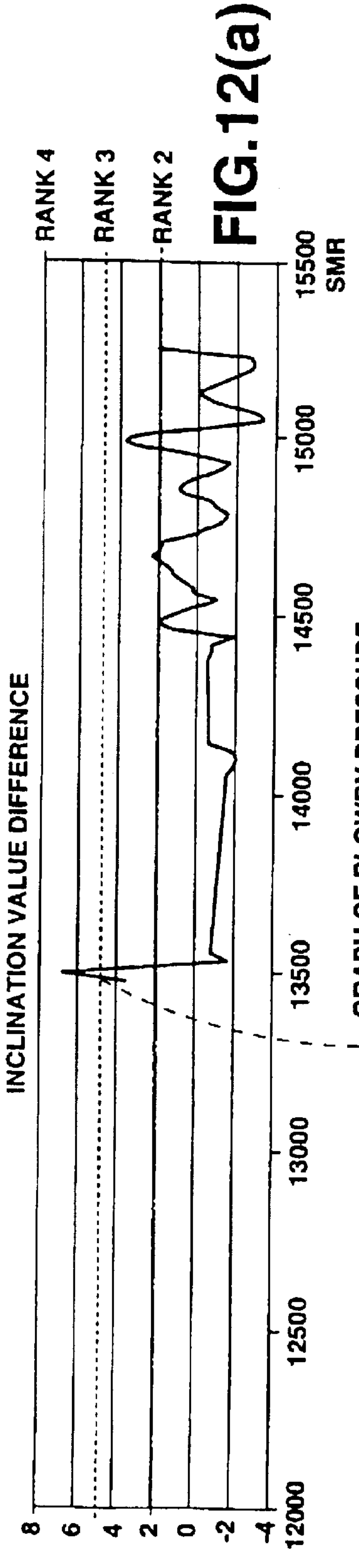
FIGS. 12(*a*) and 12(*b*) are graphs showing embodiments of trend data about a blowby pressure.
Figure 12B:
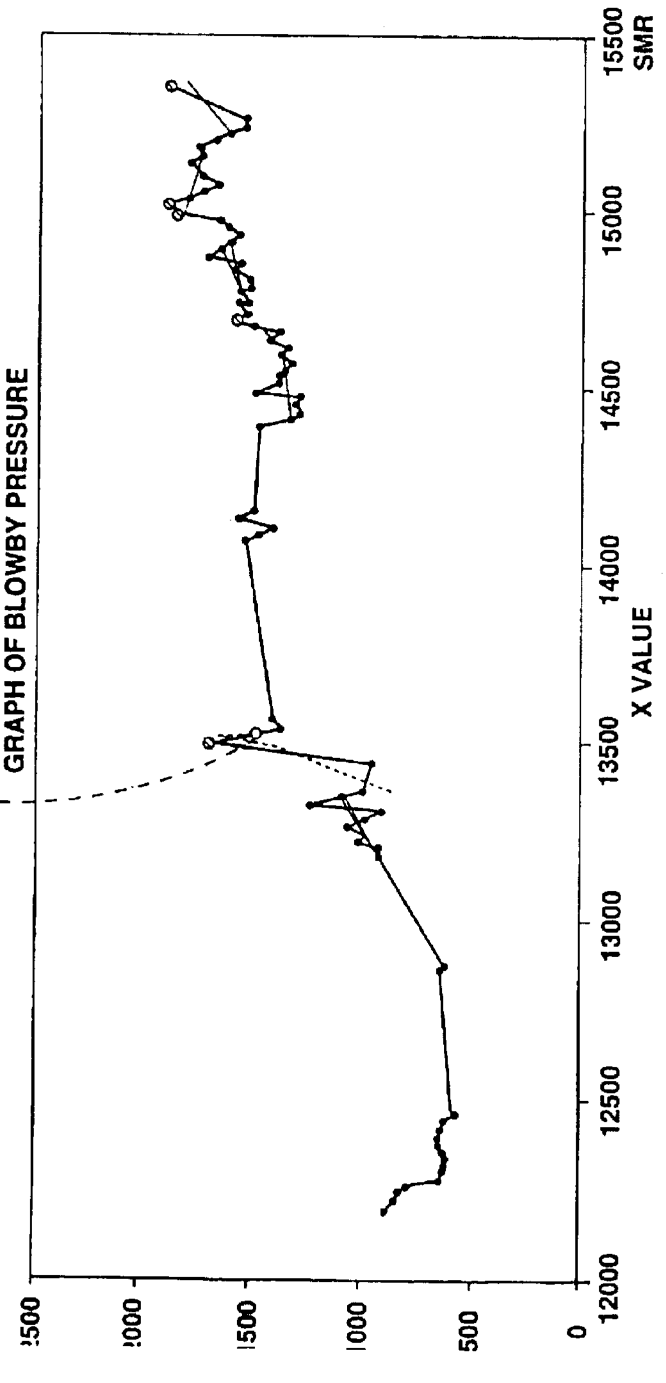

FIG. 12(*b*) is a graph showing trend data of the blowby pressure, and FIG. 12(*a*) is a graph obtained by calculating the inclination difference a1−a2 of the trend data of FIG. 12(*b*). For example, the value of FIG. 12(*a*) enters Rank 3 when the inclination difference becomes large in FIG. 12(*b*) as indicated by the broken line.

FIG. 7 shows an output example (display example) of the judged result of trend data.

As shown in FIG. 7, for example, the "engine" is associated with the "component", the "blowby pressure" with the "item", "10180" with the "service meter clocking value SMR at the judgment", "May 30, 2000" with "date at the judgment", "802" with the "sensor-detected value at the judgment", the "judging method based on an absolute value of trend data", "3" with the "rank", and "blowby value is fairly high" with the "description of rank".

FIG. 8 shows an output example (display example) of the judged result of error code.

As shown in FIG. 8, the "engine" is associated with the "component", "E0001" with the "error code", "20" with "the count number for the unit time", "4" to the "rank", and "Very many occurrences in recent 100H" with the "description of rank".

The aforesaid "description of rank" can be described in association with the actual running state of the construction machines 31, 32.

Figure 9:
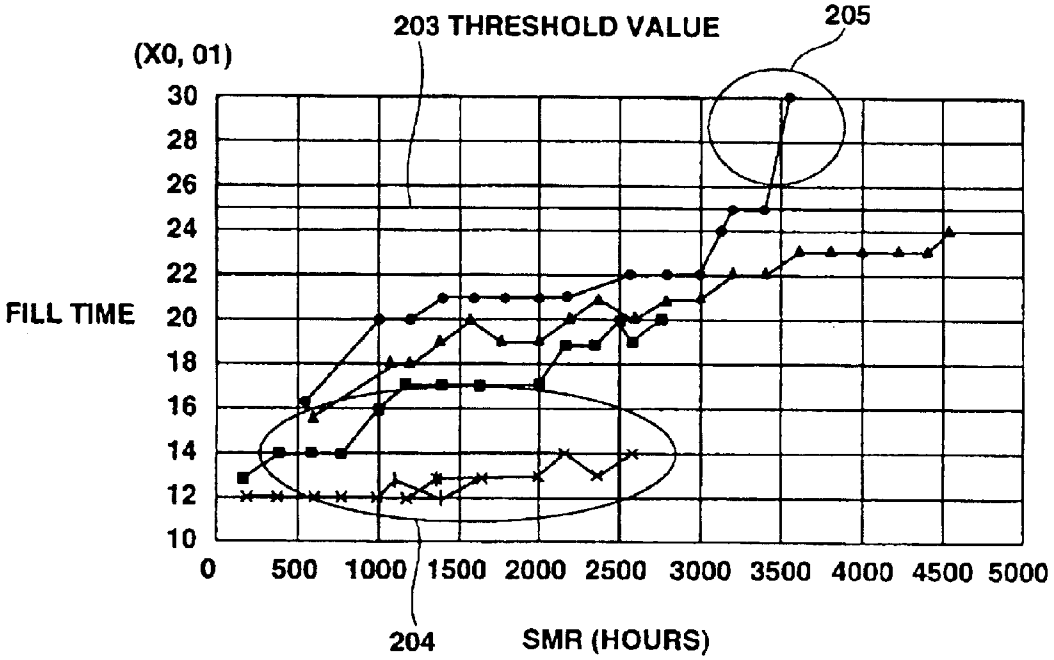
FIG. 9 is a diagram showing trend data of fill time of a hydraulic clutch of a transmission.

FIG. 9 shows an example of trend data of fill time of a hydraulic clutch of the transmission of a dump truck. When the fill time indicates a low value indicated by 204, normal running is indicated, and the "description of rank" shows the state as "normal". But, when the fill time exceeds the threshold value 203, the clutch is abraded and slips, possibly resulting in that the dump truck is disabled to run. Therefore, the "description of rank" indicates it as "very high (long)". The administrator such as a maintenance person can easily know the states of the construction machines 31, 32 from information of the "description of rank".

The aforesaid ranking can also be made in connection with frequency map data. The frequency map data will be described below.

Figure 21:
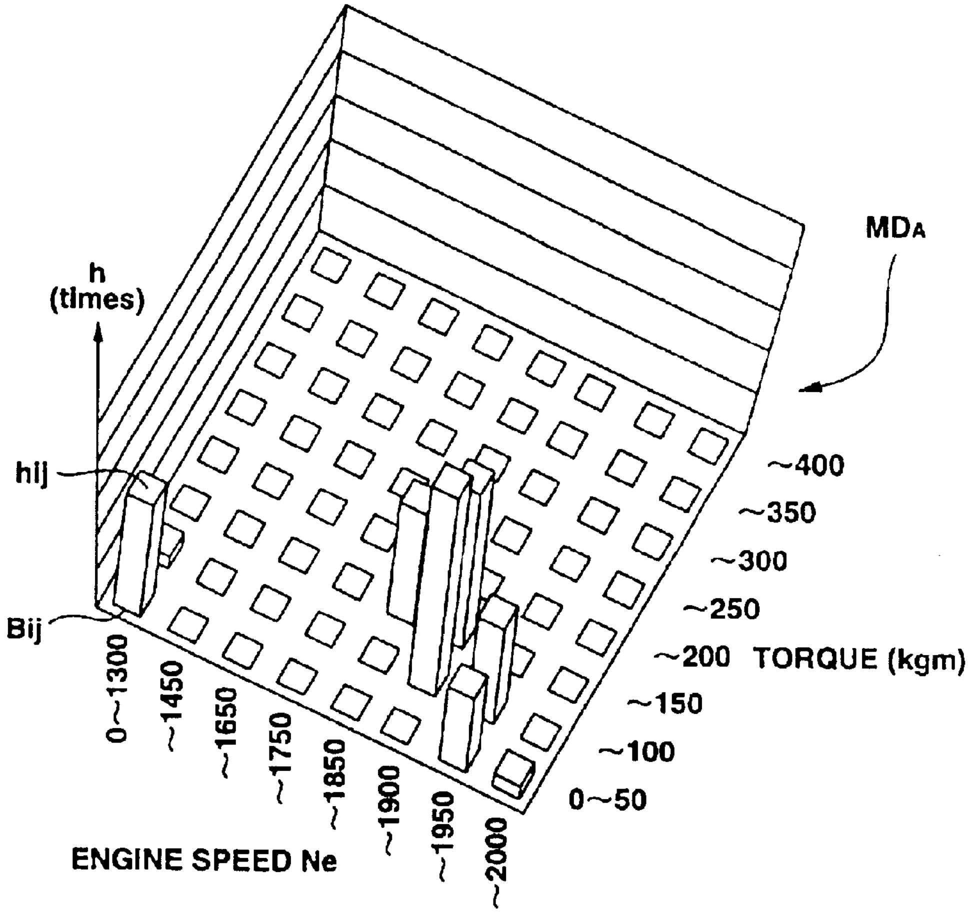
FIG. 21 is a diagram showing map data of an engine load frequency.

FIG. 21 shows load frequency map data MDA of the engine.

As shown in FIG. 21, a two-dimensional plane with engine speed Ne and torque T determined as coordinate axes is split into a plurality of blocks Bij. According to the sensor-detected values of the engine speed Ne and the torque T, frequency (number of times) hij of entering the respective blocks Bij in the unit time is added up. Each of the blocks Bij is determined to have weight γij corresponding to a magnitude of the load of the block. For example, a block corresponding to a rated point on the torque curve of the engine is determined to have a maximum weight. Accordingly, engine damage (severity) δ is determined by the following equation (1) on the basis of the load frequency map data MDA.

$$\delta = \Sigma hij \cdot \gamma ij \quad (1)$$

The above formula (1) indicates that the engine has a larger damage (severity) as the engine is operated at the engine speed with a large load and a large torque value for a longer period.

Therefore, each threshold value is determined relative to the engine damage amount δ in the same way as in the aforesaid FIG. 2(*a*) and the threshold value and the actual engine damage δ are compared to determine abnormality degrees of the engine damage in Ranks 1, 2, 3, 4.

Figure 20A:
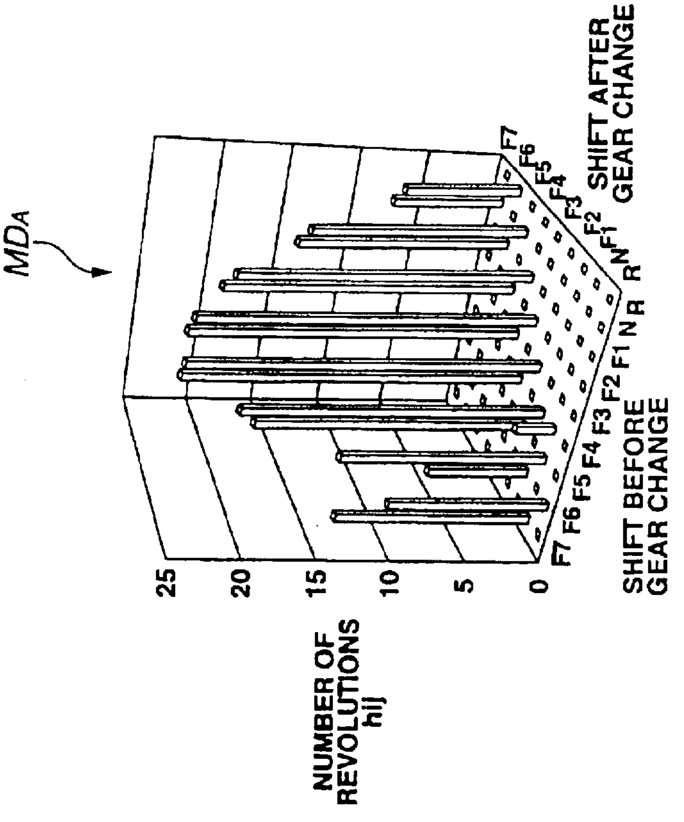
FIGS. 20(*a*) and 20(*b*) are diagrams showing frequency map data of an frequency to engage a hydraulic clutch.
Figure 20B:
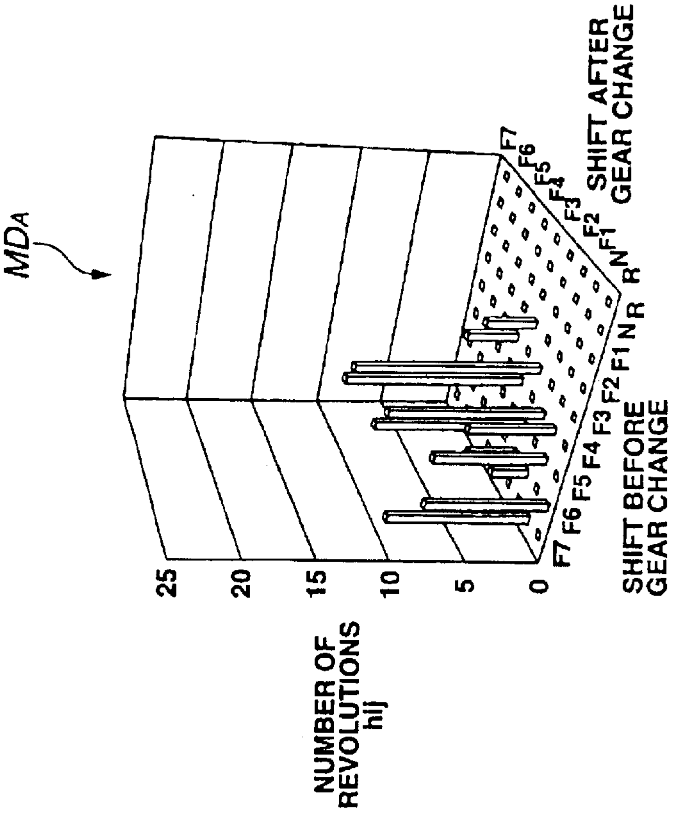

Similarly, FIG. 20(*a*) shows gear change frequency map data MDA of the transmission of a dump truck.

As shown in FIG. 20(*a*), the two-dimensional plane with the speed stages before and after the gear change of the transmission determined as respective coordinate axes is split into a plurality of blocks. Here, the speed stage consists of R (reverse), N (neutral), F1 (first speed), F2 (second speed), F3 (third speed), F4 (fourth speed), F5 (fifth speed), F6 (sixth speed) and F7 (seventh speed). And, the speed stages before and after the gear change are calculated according to the sensor-detected value of the number of revolutions of each shaft of the transmission, and a frequency (number of times) hij entering the each block in the unit time is added up according to the calculated result. The each block is determined to have weight γij corresponding to the magnitude of a load of the block. Thus, transmission damage (severity) δ is determined on the basis of the load frequency map data MDA in the same way as the aforesaid formula (1).

In the same way as in the aforesaid FIG. 2(*a*), each threshold value is determined relative to the transmission damage δ and the actual transmission damage δ and the threshold value are compared, to determine the abnormality degrees of the transmission damage in Ranks 1, 2, 3, 4.

The aforesaid frequency map data MDA can be calculated by the controller 40 of the construction machines 31, 32. The frequency map data MDA is downloaded from the construction machines 31, 32 via the communications satellite 5 or by the portable terminal device 19, and sent to the server unit 11 through the Internet 7. The server unit 11 calculates the damage amount 67 and an abnormality degree of the damage amount δ. It is just an example, and it may be configured to send the sensor-detected value from the construction machines 31, 32 to the server unit 11, and the server unit 11 calculates the frequency map data MDA on the basis of the sensor-detected value. A communications amount and a memory capacity of the server unit 11 can be reduced when the construction machines 31, 32 calculate the frequency map data MDA and send it to the server unit 11.

And, the ranking threshold value for the abnormality degree may be determined with the predetermined "usage" as a standard.

Generally, the construction machines are sold upon researching their usage at a worksite. The usage relates to a specific fuel consumption, a cycle load change amount, a vehicle payload, a maximum speed, a clutch engaging frequency of the transmission, etc. The above research is made in order to provide the customer with the construction machines having appropriate specifications in an appropriate number of fleets according to the researched results. But, the construction machines are often used in a hostile environment different from the research made at the time of sales. Therefore, where the construction machines are used severely as compared with the research at the sales, clocking of an overhaul is advanced from the first expected schedule and the construction machines are shortened their service lives.

Therefore, it is demanded to configure a system so that if the usage is severe, it can advise the customer to use the construction machines properly. When such advice can be given to the customer, there is obtained an effect of extending an overhaul schedule of the construction machines. Then, an embodiment which can respond to the above demand will be described.

FIG. 18 shows a research sheet about the usage of a dump truck. As shown in FIG. 18, for each section of the running course at a worksite (such as a wide-area mine), an inclination, a distance, a curve radius, a running time, a vehicle speed, an engine speed, speed stages before and after the gear change of the transmission, a section where the retarder brake is used, usage of the foot brake, and an evaluation of a road surface are entered into the research sheet. Load K of each section is calculated by the following formula (2) where a gloss weight of the dump truck is W, a section distance is L, and a gradient is α.

$$K=W\cdot L\cdot\alpha \tag{2}$$

And, load factor Lf of the running course is calculated by the following formula (3) where rated output of the dump truck is PW and a cycle time is t.

$$Lf=(60\times100)/(75\times PW\times3600)\times\Sigma K \tag{3}$$

The calculated result is stored in the database 12 as a predicted value of the load factor of each of the construction machines 31, 32.

Then, Ranks 1, 2, 3, 4 are determined with the predicted load factor Lf at the research as a standard.

The actual load factor of the dump truck is obtained by detecting a fuel consumption and torque by the sensors 41. The actual load factor is sent from the construction machines 31, 32 to the server unit 11 and compared with the predicted load factor stored in the database 12. For example, a difference between the actual load factor and the predicted load factor is compared with the threshold value. The abnormality degree changes in increasing order of Ranks 1, 2, 3, 4 as the difference between them becomes larger. For example, when the difference becomes Rank 2 or higher, a warning that the construction machine shall be used properly can be sent as email to the customer.

Figure 19:
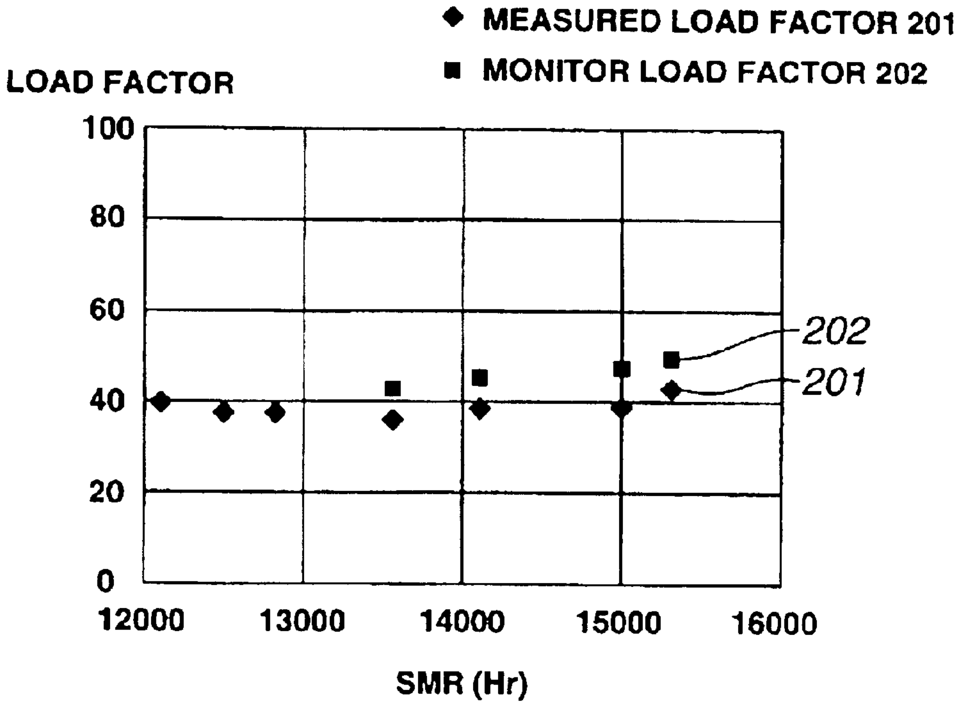
FIG. 19 is a graph showing an engine load factor.

FIG. 19 is a graph showing an actually measured load factor and a monitor load factor which indicates standard usage over time. The warning may be sent as email to the customer when measured load factor 201 is very different from monitor load factor 202.

In addition to the load factor, the fuel consumption rate, the cycle load change amount, the payload, the maximum speed, the clutch engaging times of the transmission, etc. may be previously researched as predicted values, and Ranks 1, 2, 3, 4 may be determined with the predicted values used as a standard.

Here, the fuel consumption rate is in correlation with the overhaul time of the engine. For example, when the predicted value of the fuel consumption rate is 70L/H, the overhaul is scheduled to be made after 16000H. But, when the actual fuel consumption rate becomes 90L/H, the overhaul timing is advanced to be made after 14000H. Then, where the actual consumption rate becomes higher than the predicted value and the overhaul timing is advanced to be made earlier, a warning about it may be sent as email to the customer.

Figure 22A:
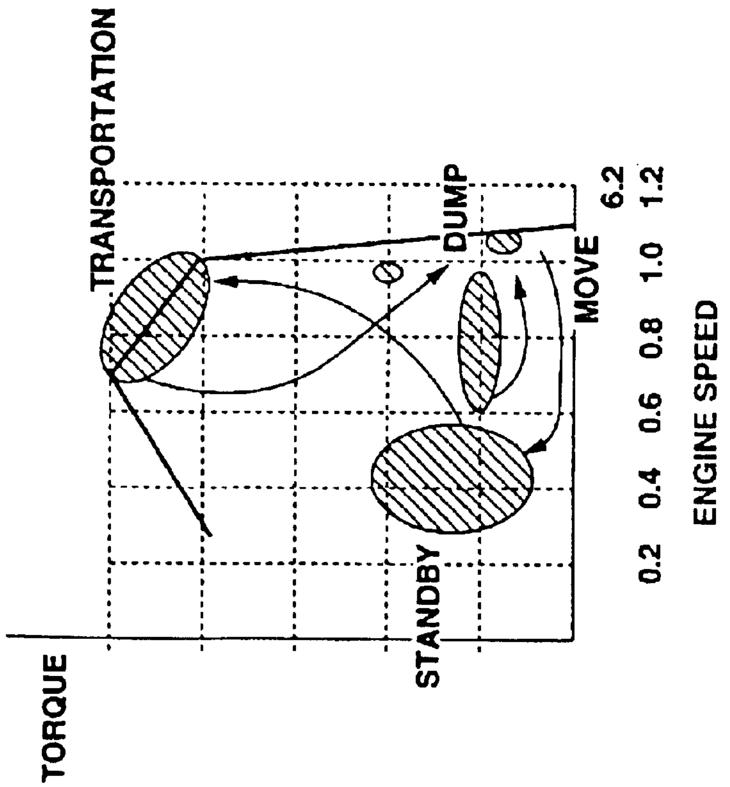
FIGS. 22(*a*) and 22(*b*) are graphs showing cyclic load variations.
Figure 22B:
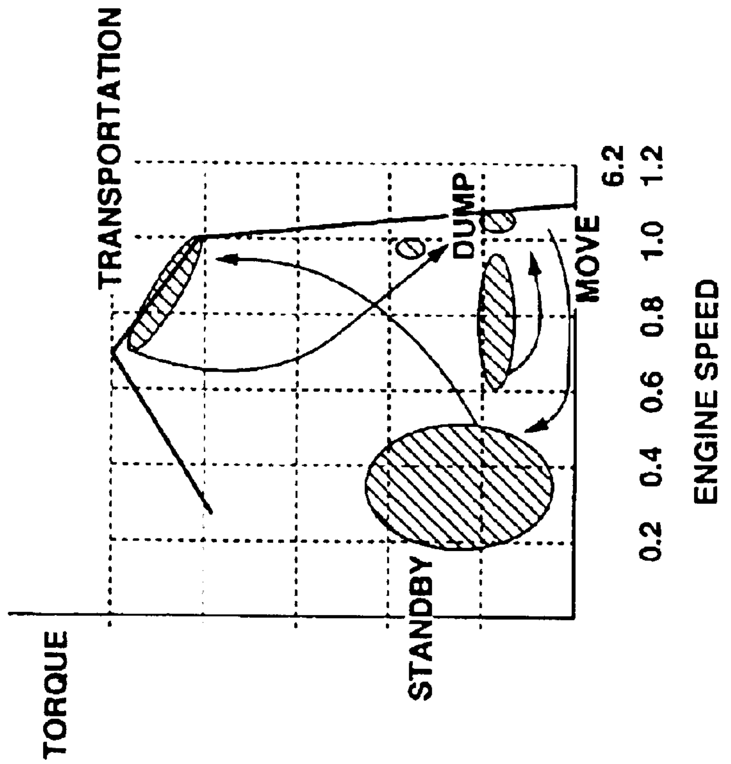

FIGS. 22(*a*) and 22(*b*) show a cycle load change amount.

The two-dimensional plane shown in FIGS. 22(*a*) and 22(*b*) corresponds with the two-dimensional plane with the engine speed Ne and the torque T as the coordinate axes shown in FIG. 21. The dump truck operates repeatedly with a cycle time of standby→transportation→dump→move as shown in FIGS. 22(*a*) and 22(*b*). When the areas indicated by the broken lines in FIGS. 22(*a*) and 22(*b*) are large, it means that a frequency of the dump truck entering the corresponding blocks is high. In other words, FIG. 22(*b*) shows that the time of transportation and dumping is smaller than the standby time, and a load is small. But, FIG. 22(*a*) shows that the standby time and the transportation and dumping time are approximately the same, and a load is large. Where the actually measured value shown in FIG. 22(*a*) is obtained relative to the predicted value shown in FIG. 22(*b*), a warning indicating that the load is large may be sent as email to the customer.

As shown in FIGS. 22(*a*) and 22(*b*), the actual frequency (FIG. 22(*a*)) and the predicted frequency (FIG. 22(*b*)) of the clutch engaging times of the transmission may be compared, and a warning may be sent as email to the customer.

As described above, the onboard information D1 is processed by the server unit 11.

Then, processing of data of the oil analysis information D2 will be described.

Where the oil is an engine oil for example, its analyzed content is roughly divided into metal components (iron Fe, silicon Si, etc.) as contained impurities and oil performance degradation degrees (a viscosity, a degree of oxidation, etc.). For the oil analysis information D2, the respective items, namely a content of iron Fe, a content of silicon Si, a viscosity, a degree of oxidation . . . , are ranked its abnormality degree in Ranks 1, 2, 3, 4 by the same judging method as in FIGS. 2(*a*) to 2(*c*) in the same way as the onboard information D1. Ranking may be made by the oil analysis center 17 and sent to the server unit 11 through the terminal device 18 and the Internet 7. The analyzed results by the oil analysis center 17 may be sent without ranking to the server unit 11 through the terminal device 18 and the Internet 7 so to rank them by the server unit 11.

Then, processing of data of the inspection information D3 will be described.

Respective items of the inspection information D3 are a worn or broken state of wear-and-tear items such as tires, a cracked or broken state of pipes such as a hose, a speed of the operating machine, sounds produced by respective components such as the engine, an exhaust state of the engine, etc. For the inspection information D3, the respective items are ranked their abnormality degrees in Ranks 1, 2, 3, 4 by the same judging method as in FIGS. 2(*a*) to 2(*c*) in the same way as the onboard information D1. Ranking may be made by the portable terminal device 19, and data of the results may be sent to the server unit 11 through the Internet 7. Data not ranked may be input to the terminal device 19 and sent to the server unit 11 through the Internet 7 to rank by the server unit 11.

The server unit 11 processes to judge an abnormality degree on the basis of a combination of all or two of the onboard information D1, the oil analysis information D2 and the inspection information D3. The processing will be described with reference to FIGS. 12(*a*) and 12(*b*) to FIG. 17. An example of judging an abnormality degree of the engine from the onboard information D1 (sensor-detected value of the engine) and the oil analysis information D2 (analyzed results of the engine oil) will be described.

Figure 13:
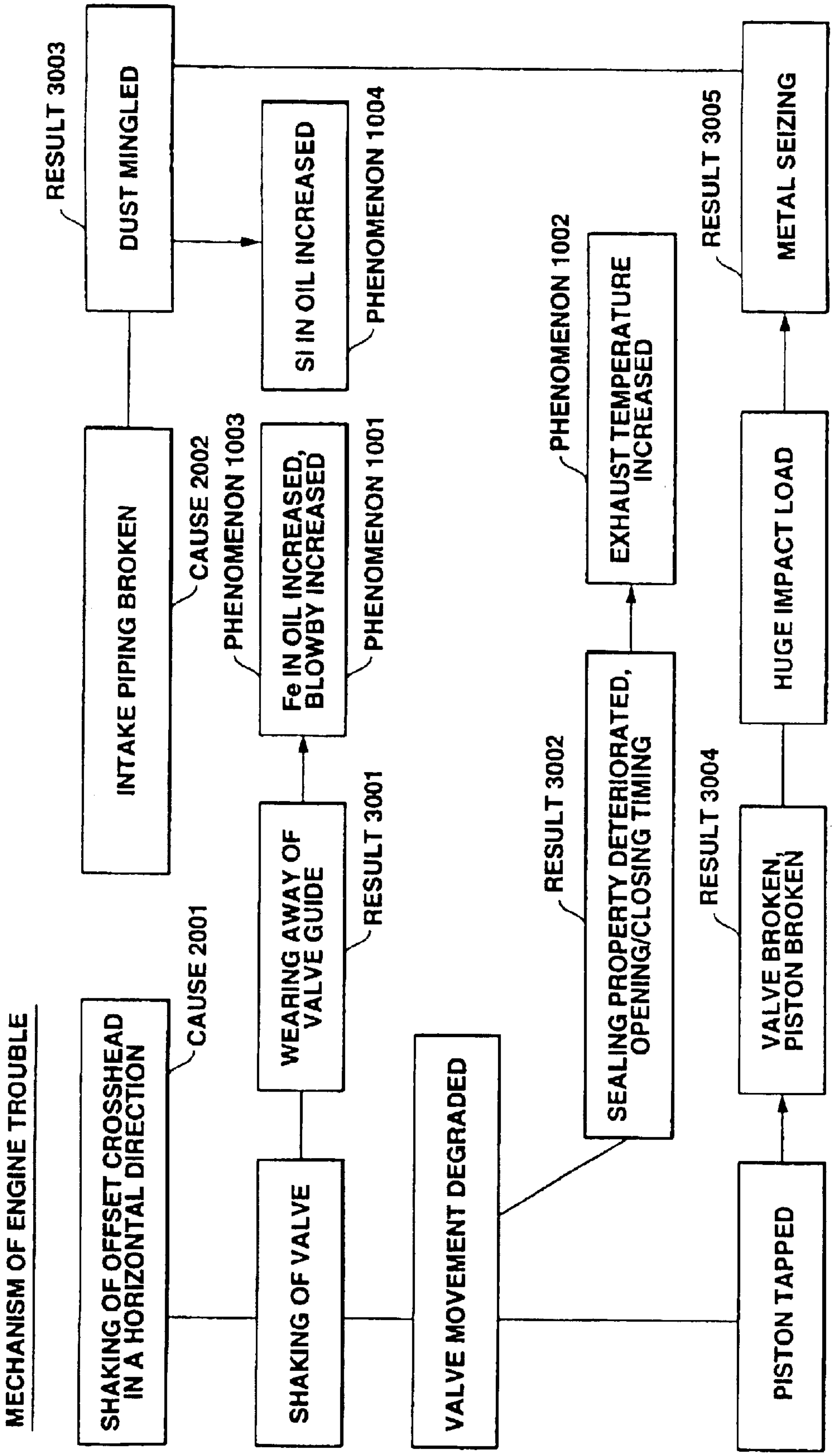
FIG. 13 is a diagram showing a mechanism of an engine trouble.

FIG. 13 shows how an engine trouble is caused. FIG. 13 shows a relation among a cause of the engine trouble, phenomena and a result. The engine trouble is not caused by only one item (e.g., an increase in blowby pressure) but often caused by a combination of many items.

Specifically, cause 2001 that an offset crosshead shakes in a horizontal direction produces result 3001 that the valve guide is abraded, result 3002 that the sealing property is degraded, result 3004 that a valve or a piston is broken and result 3005 that a metal is seized. Cause 2002 that an intake pipe is broken produces result 3003 that dust is mingled and result 3005 that a metal is seized.

The result 3001 that the valve guide is abraded relates to phenomenon 1003 that iron Fe in the oil increases and phenomenon 1001 that the blowby pressure increases. And, the result 3002 that the sealing property is degraded relates to phenomenon 1002 that the exhaust temperature increases. The result 3004 that the valve or the piston is broken, relates to the phenomenon 1003 that iron Fe in the oil increases, the phenomenon 1001 that the blowby pressure increases, and the phenomenon 1002 that the exhaust temperature increases. The result 3003 that dust is mingled relates to phenomenon 1004 that silicon Si in the oil increases. The result 3005 relates to the phenomenon 1003 that iron Fe in the oil increases, the phenomenon 1001 that the blowby pressure increases, the phenomenon 1002 that the exhaust temperature increases and the phenomenon 1004 that silicon Si in the oil increases.

The relation shown in FIG. 13 is indicated as shown in FIG. 14. FIG. 14 shows a table to determine the engine troubles on the basis of the detected results of the items of the blowby pressure and the exhaust temperature in the onboard information D1 and the items of the iron Fe content and the silicon Si content in the engine oil in the oil analysis D2.

As shown in FIG. 14, the result 3001 that the valve guide is abraded and the result 3003 that dust is mingled are set to Rank 1. The result 3002 that the sealing property is deteriorated is set to Rank 2. The result 3004 that the valve and piston are broken is set to Rank 3. And, the result 3005 that a metal is seized is set to Rank 4.

Therefore, if the abnormality degree of Rank 1 or Rank 2 of the blowby pressure increase is obtained from the onboard information D1 and the abnormality degree of Rank 1 or Rank 2 of the iron Fe increase in the oil is obtained from the oil analysis information D2, it is judged that the engine trouble of Rank 1 or Rank 2 of the valve guide abrasion has occurred. If an abnormality degree at Rank 2 of the exhaust temperature increase is obtained from the onboard information D1, it is judged that a trouble at Rank 2 of the sealing property deterioration has occurred. When an abnormality degree of Rank 1, Rank 2 or Rank 3 that the silicon Si in the oil has increased is obtained from the oil analysis information D2, it is judged that an engine trouble of Rank 1, Rank 2 or Rank 3 has occurred. If an abnormality degree of Rank 3 that the blowby pressure has increased and an abnormality degree of Rank 3 that the exhaust temperature has increased are obtained from the onboard information D1 and if an abnormality degree of Rank 3 that the iron Fe in the oil has increased is obtained from the oil analysis information D2, it is judged that an engine trouble of Rank 3 that the valve and piston are broken has occurred. And, if an abnormality degree of Rank 4 that the blowby pressure has increased and an abnormality degree of Rank 4 that the exhaust temperature has increased are obtained from the onboard information D1 and if an abnormality degree of Rank 4 that the iron Fe in the oil has increased and an abnormality degree of Rank 4 that the silicon Si in the oil has increased are obtained from the oil analysis information D2, it is judged that an engine trouble of Rank 4 that a metal is seized has occurred.

Figure 16:
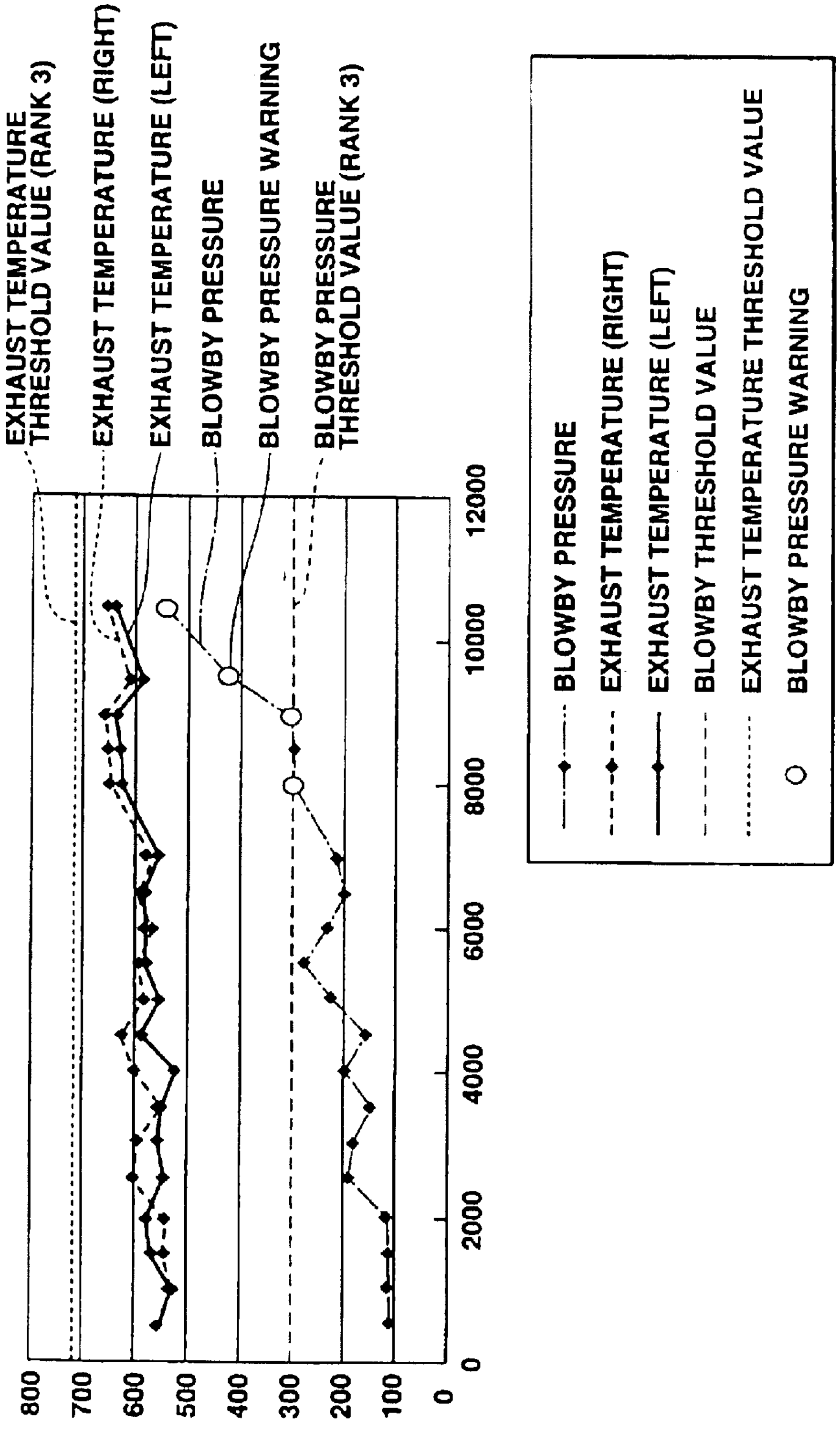
FIG. 16 is a graph showing trend data of a blowby pressure and exhaust temperatures.

FIG. 16 shows trend data of the blowby pressure and the exhaust temperatures. It is assumed that the exhaust temperatures are those of right and left exhaust pipes. As indicated by the mark "○" in the drawing, where the blowby pressure exceeds the threshold value of Rank 3, email indicating a warning that the blowby pressure has entered into Rank 4 is sent from the server unit 11 to the terminal device.

Figure 17:
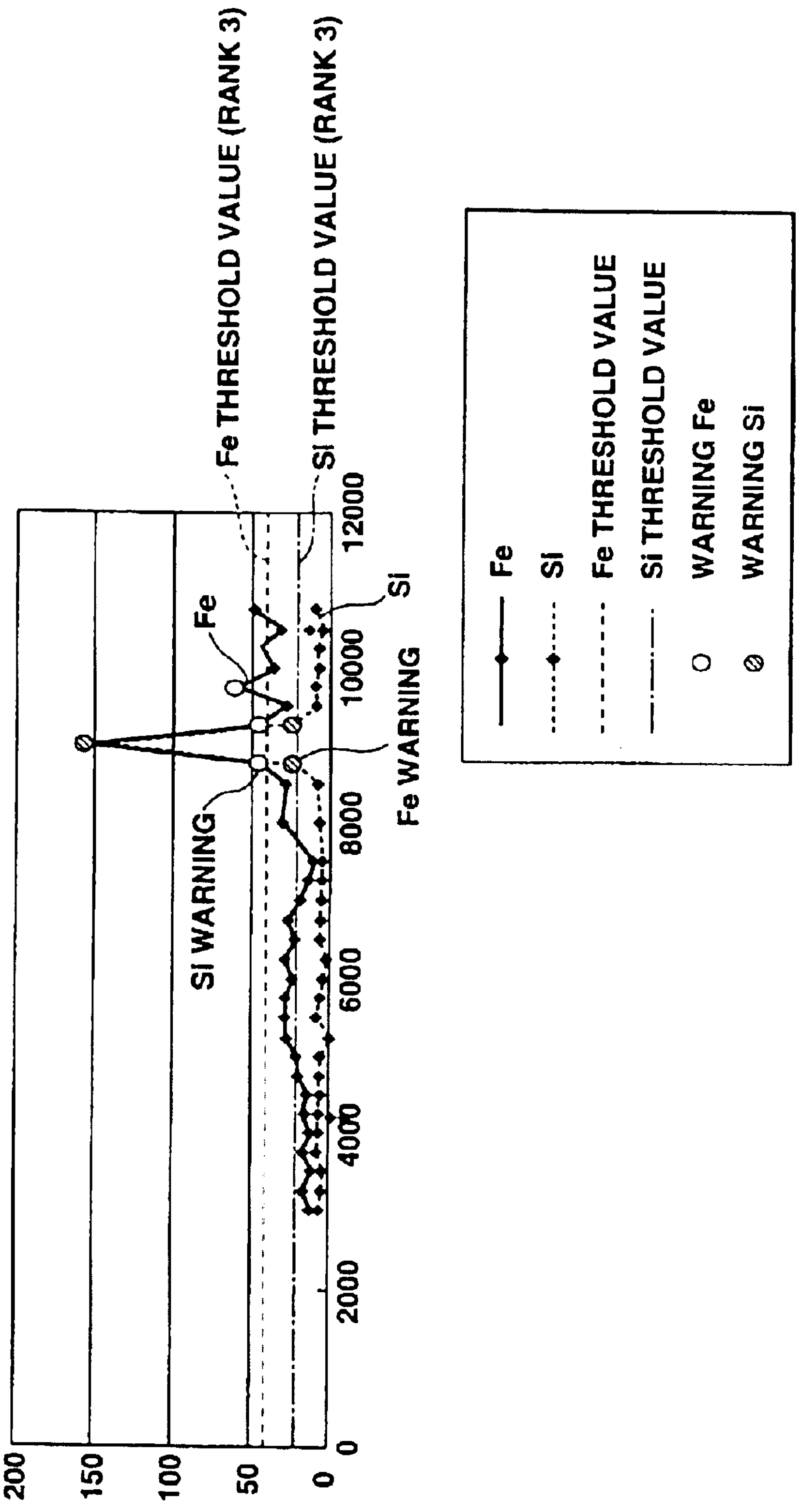
FIG. 17 is a graph showing trend data of a content of iron Fe and that of silicon Si in an engine oil.

FIG. 17 shows trend data of an iron Fe content and a silicon Si content in the oil. As indicated by the mark "○" in the drawing, if the Fe content exceeds the threshold value of Rank 3 for example, email indicating a warning that the Fe content has entered into Rank 4 is sent from the server unit 11 to the terminal device, and as indicated by the mark "●", if the Si content exceeds the threshold value of Rank 3 for example, email indicating a warning that the Si content has entered into Rank 3 is sent from the server unit 11 to the terminal device.

It is assumed that an abnormality degree is judged according to the "judging method based on an absolute value of trend data".

For example, when the service meter clocking value is 9000H in FIG. 16 and FIG. 17, the blowby pressure and an amount of the iron Fe content indicate an abnormality degree of Rank 3, but the exhaust temperature does not indicate an abnormality degree of Rank 3. Therefore, it is judged that the engine trouble does not become a trouble of "valve and piston broken" of Rank 3 and remains as a trouble of "valve guide worn away" of Rank 2.

In addition to the "judging method based on an absolute value of trend data", the "judging method based on an increment from the initial value of trend data" and the "judging method based on a gradient of trend data" may be employed.

Figure 15A:
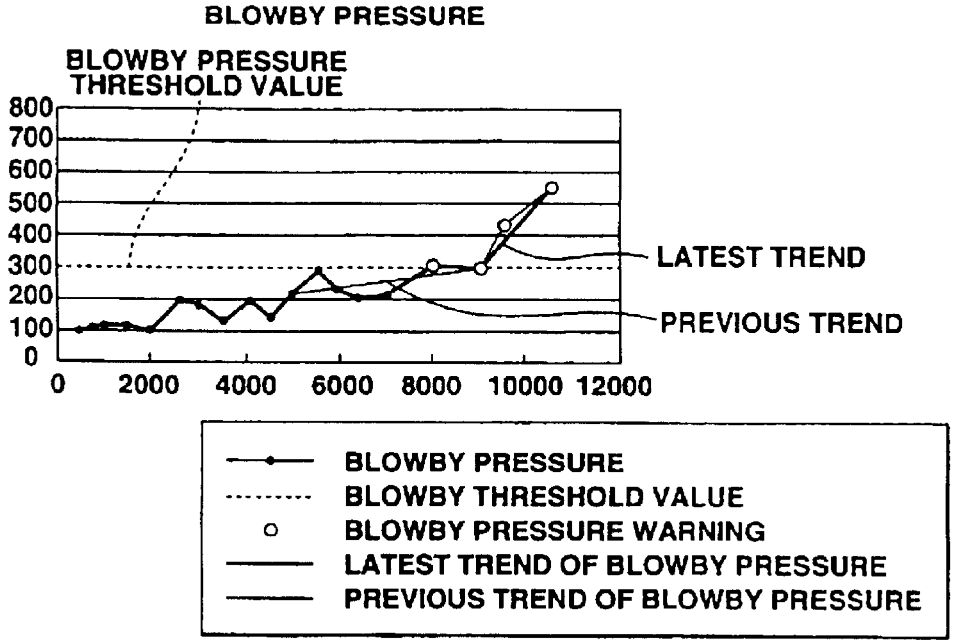
FIGS. 15(*a*) and 25(*b*) are graphs showing trend data of a blowby pressure and an exhaust temperature, respectively.
Figure 15B:
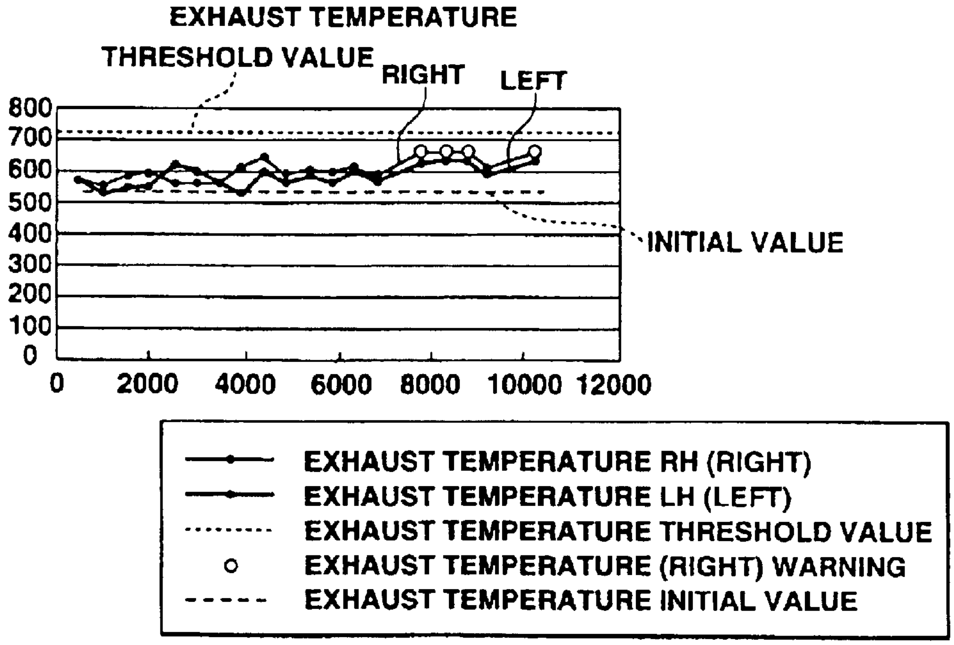

FIGS. 15(*a*) and 15(*b*) show a graph (FIG. 15(*a*)) showing trend data of the blowby pressures and a graph (FIG. 15(*b*)) showing trend data of the exhaust temperatures.

A difference of gradients of trend data about the blowby pressures exceeds the threshold value indicating Rank 3 in the period indicated by the mark "○" in FIG. 15(*a*). Therefore, it is judged that the blowby pressure is in the abnormality degree of Rank 4. As indicated by the mark "○", when the service meter clocking value exceeds 8000H, the absolute value of the blowby pressure exceeds the threshold value of Rank 3.

As indicated by the mark "○" in FIG. 15(*b*), when an increment relative to the initial value of the exhaust temperature exceeds the threshold value indicating Rank 3, it is judged that the exhaust temperature is in the abnormality degree of Rank 4. In the period indicated by the mark "○", the absolute value of the exhaust temperature has not reached the threshold value indicating Rank 3.

As described above, the abnormality is judged with the oil analysis information D2 taken into consideration other than the onboard information D1 according to this embodiment, so that the abnormality, such as an engine trouble, involving multiple causes can be judged accurately.

Besides, an abnormality may be judged with the inspection information D3 taken into consideration. For example, a rank of the engine trouble such as a valve and piston damage, metal seizing or the like may be determined according to a rank of an abnormality degree obtained by visually checking the states of a strainer, a filter, and a drain plug for the engine oil, a rank of an abnormality degree of the onboard information D1 (the blowby pressure and the exhaust temperature), and a rank of an abnormality degree of the oil analysis information D2 (an iron Fe content and a silicon Si content).

Complex abnormal troubles can be judged on the basis of the onboard information D1 and the inspection information D3. And, complex abnormalities can also be judged on the basis of the oil analysis information D2 and the inspection information D3.

Then, the displays on the display screen of the terminal device will be described with reference to FIG. 23 to FIG. 33. The following embodiment will be described with reference to the contents displayed on the display screen of the terminal device 51 of Maintenance Division of the agency 50. A warning that a periodical report of Ranks 1 to 4 related to the construction machines 31, 32 which are administered by the agency 50 has been prepared is sent as email to the terminal device 51 of Maintenance Division of the agency 50, and the warning and the periodical report of Ranks 1 to 4 are displayed on the display screen.

Specifically, when new abnormality information and periodical report are created by the server unit 11, data of warning it is sent as email to the terminal device 51 of Maintenance Division of the agency 50 through the Internet 7.

Figure 23:
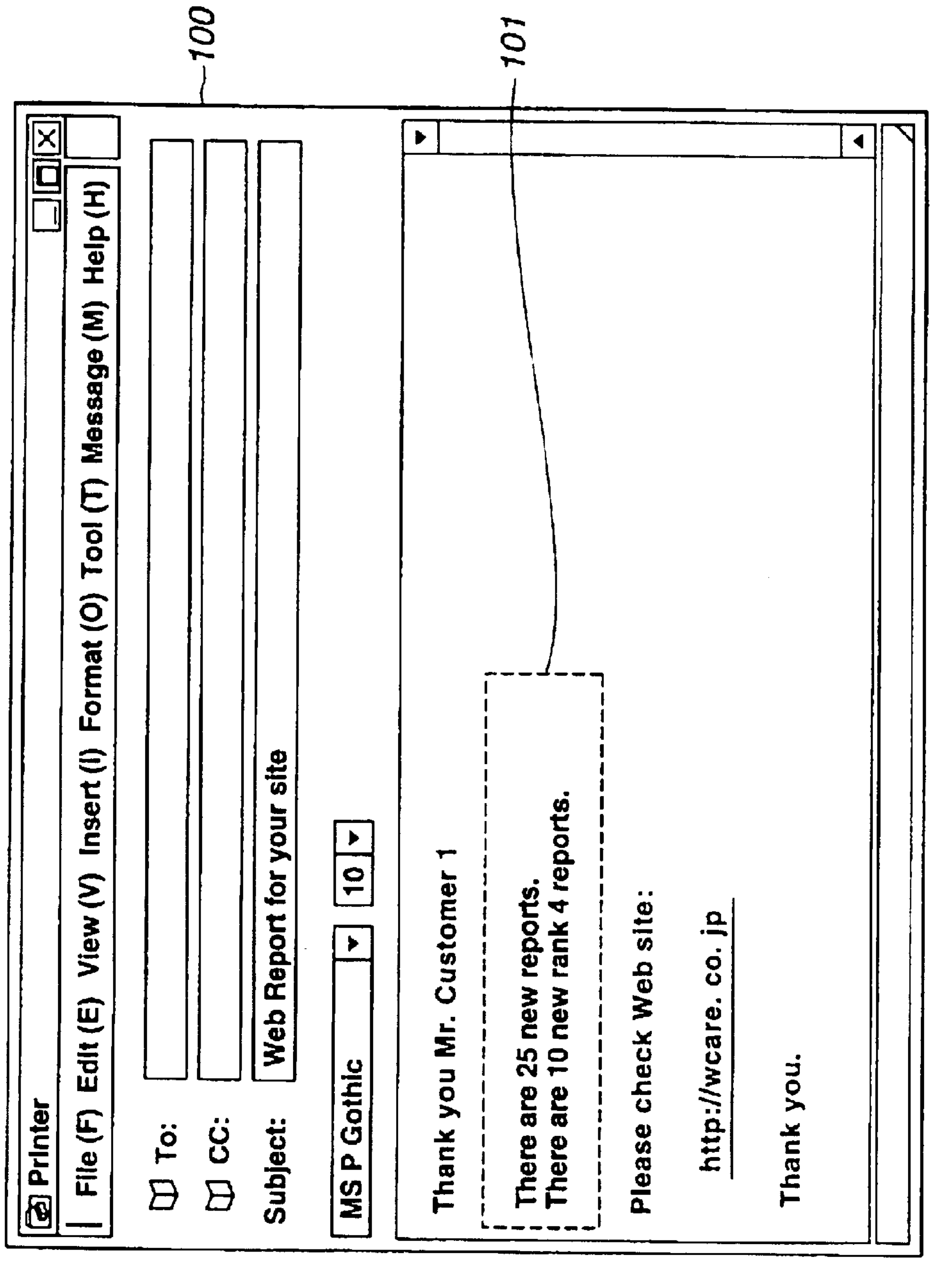
FIG. 23 is a diagram showing an example of a display screen of a terminal device.

FIG. 23 shows display screen 100 of the terminal device 51 of Maintenance Division. This display screen 100 shows warning indication 101, "There are 25 new reports. There are 10 new reports of Rank 4." A maintenance person can easily determine from the warning indication 101 whether the abnormality information and periodical report shall be examined in detail. Detailed information of the abnormality information and periodical report is retrieved by accessing the database 12 of the server unit 100.

Specifically, when a Web browser (data display software for the internet 7) is activated the terminal device 51, data of the Web page is read from the database 12 of the server unit 11 through the Web browser and displayed on the display screen of the terminal device 51. The maintenance person at the terminal device 51 can activate a screen with his or her access authority and crick buttons on each screen to make processing.

The terminal device 51 has the "front screen" when the Web browser is activated. Processing by the terminal device 51 can be started on condition that ID number and code number of the maintenance person are input. When the maintenance person inputs the ID number and the code number, the display screen 100 of the terminal device 51 changes to display the "number of reports display screen" shown in FIG. 24.

The "number of reports display screen" has number screen 102 to indicate the number of newly prepared periodical reports, the number of newly prepared periodical reports of Rank 4, the number of newly prepared periodical reports of Rank 3, the number of newly prepared periodical reports of Rank 2 and the number of newly prepared periodical reports of Rank 1 for each of the onboard information D1, the oil analysis information D2 and the inspection information D3. The maintenance person can know the details of Ranks 1 to 4 of the newly prepared periodical reports from the number screen 102.

Figure 24:
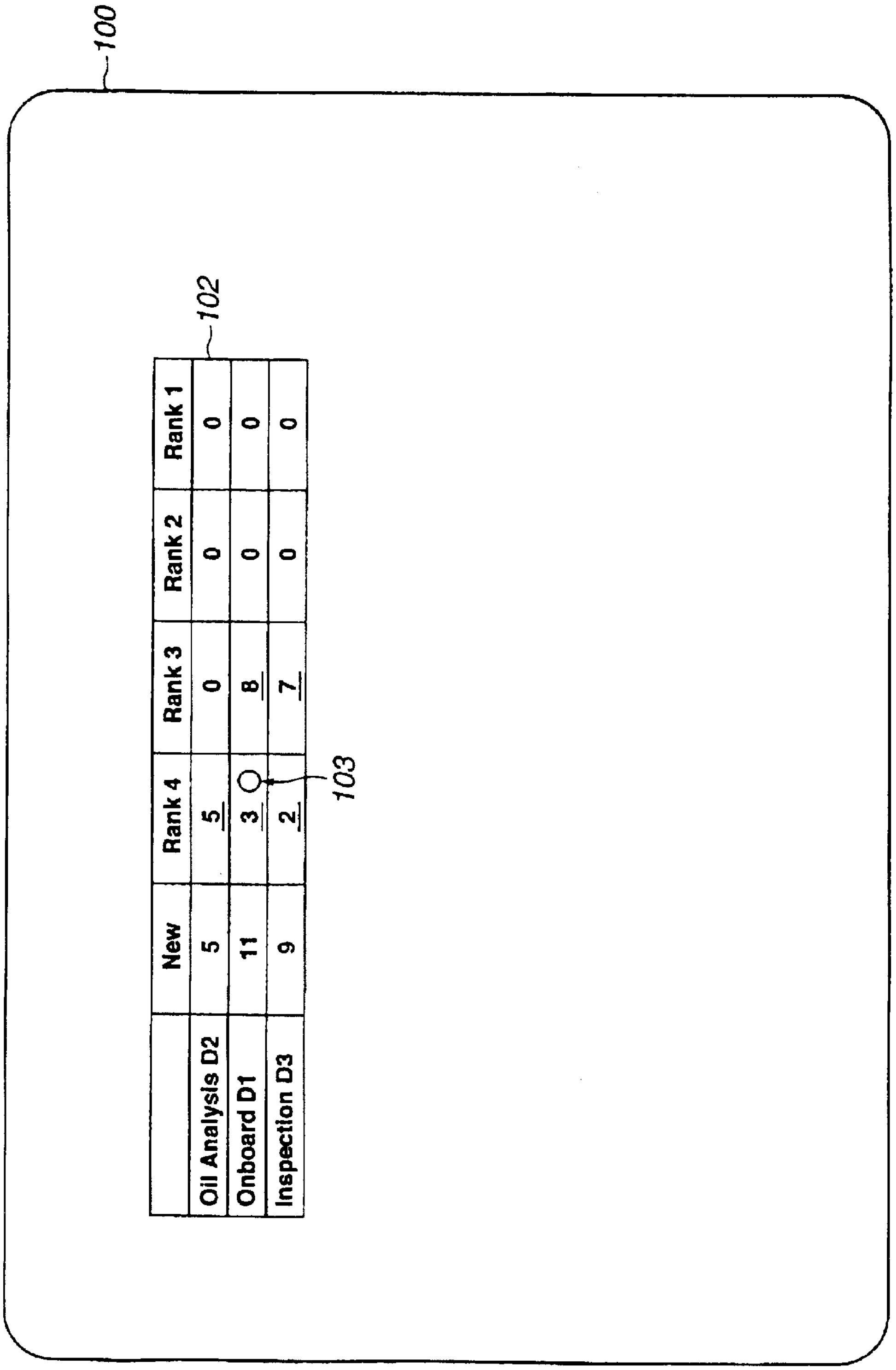
FIG. 24 is a diagram showing an example of a display screen of the terminal device.

When a predetermined part on the number of display 102 is clicked, the display screen 100 is changed to the "report list screen" shown in FIG. 25. For example, when the display section of the "onboard information D1" in the number screen 102 of FIG. 24 is clicked, list 104 of the periodical reports related to the onboard information D1 is displayed.

The "report list display screen" has the list screen 104 which shows the historic records of lists of "date", "model", "type", "serial number", "SMR (service meter clocking value)", "temporary rank", "decision rank", etc. related to the prepared periodical report.

Here, the "temporary rank" means a rank of the abnormality degree which was automatically judged by the server unit 11. The "decision rank" means a rank of the abnormality degree which is finally judged by the terminal device 51. The authority to determine the "decision rank" is given to the maintenance person on the side of the terminal device 51. According to the list screen 104, the maintenance person can know the details of the temporary rank about the onboard information D1 for each model, type and serial number of the construction machine. FIG. 25 shows the list screen 104 of the onboard information D1, and the same display is also made for the oil analysis information D2 and the inspection information D3.

As shown in FIG. 33, data can be displayed for each of the construction machines.

A graph indicating the relation between a date of a particular construction machine and the service meter clocking value SMR (H) is shown in display section 120 of the display screen 100 as shown in FIG. 33.

Display section 121 of the display screen 100 shows the "date", "service meter clocking value SMR (H)", "action", "temporary rank", "decision rank", etc. related to a particular construction machine. Here, the "action" means processing (repair or the like) of an abnormality performed on the contents (onboard information D1, oil analysis information D2, inspection information D3) of information accessed to the data base of the server unit 11 related to a particular construction machine or on the construction machine.

Figure 26:
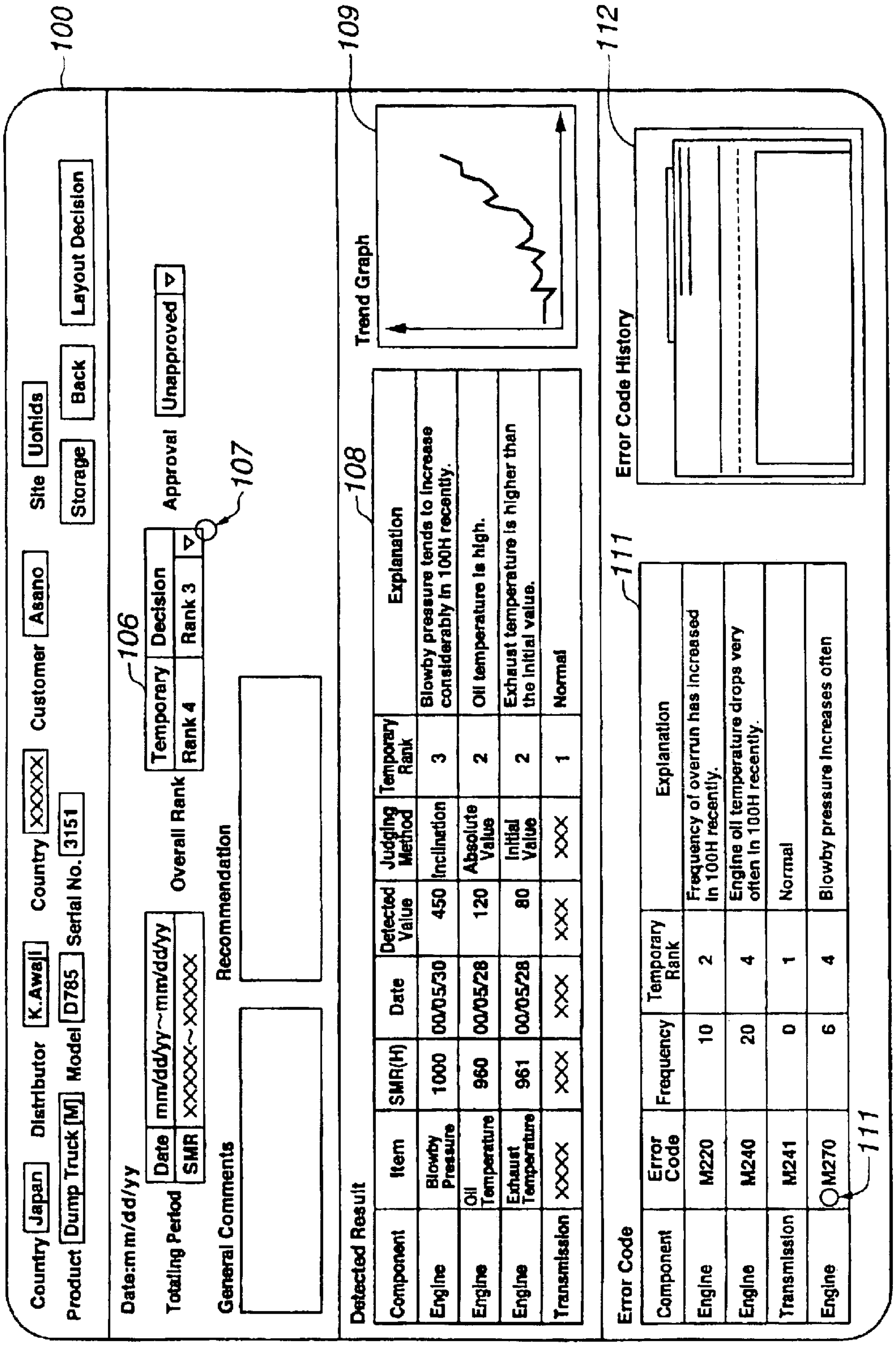
FIG. 26 is a diagram showing an example of a display screen of the terminal device.

When a predetermined point on the list screen 104 of FIG. 25 is clicked, the display screen 100 is changed to the "report display screen" shown in FIG. 26. For example, when display point 105 of the "serial number" which is "3151" in the list screen 104 of FIG. 25 is clicked, the periodical report related to the onboard information D1 of the construction machine with the corresponding model "D785" and serial number "3151" is displayed.

The "report display screen" has trend data summary screen 108 which shows the detected "components", "items", "SMR(H)", "date", "detected values", "judging method", "temporary rank" and "description" related to the trend data. And, the error code summary screen 110 showing the prepared "components", "error code", "number of times (per unit time)", "temporary rank" and "description" related to the error code is displayed.

When a predetermined point on the trend data summary screen 108 is clicked, details of its corresponding trend data is shown in display section 109. In other words, the display section 109 shows the graph of trend data shown in FIG. 4, FIG. 5 or FIG. 6. For example, when the display point of the "item" related to the "blowby pressure" in the trend data summary screen 108 is clicked, the graph of trend data shown in FIG. 6 from which "Temporary rank" of "Item" related to "Blowby pressure" is judged as "Rank 3" by the "judging method based on an gradient of trend data" is displayed.

Figure 28:
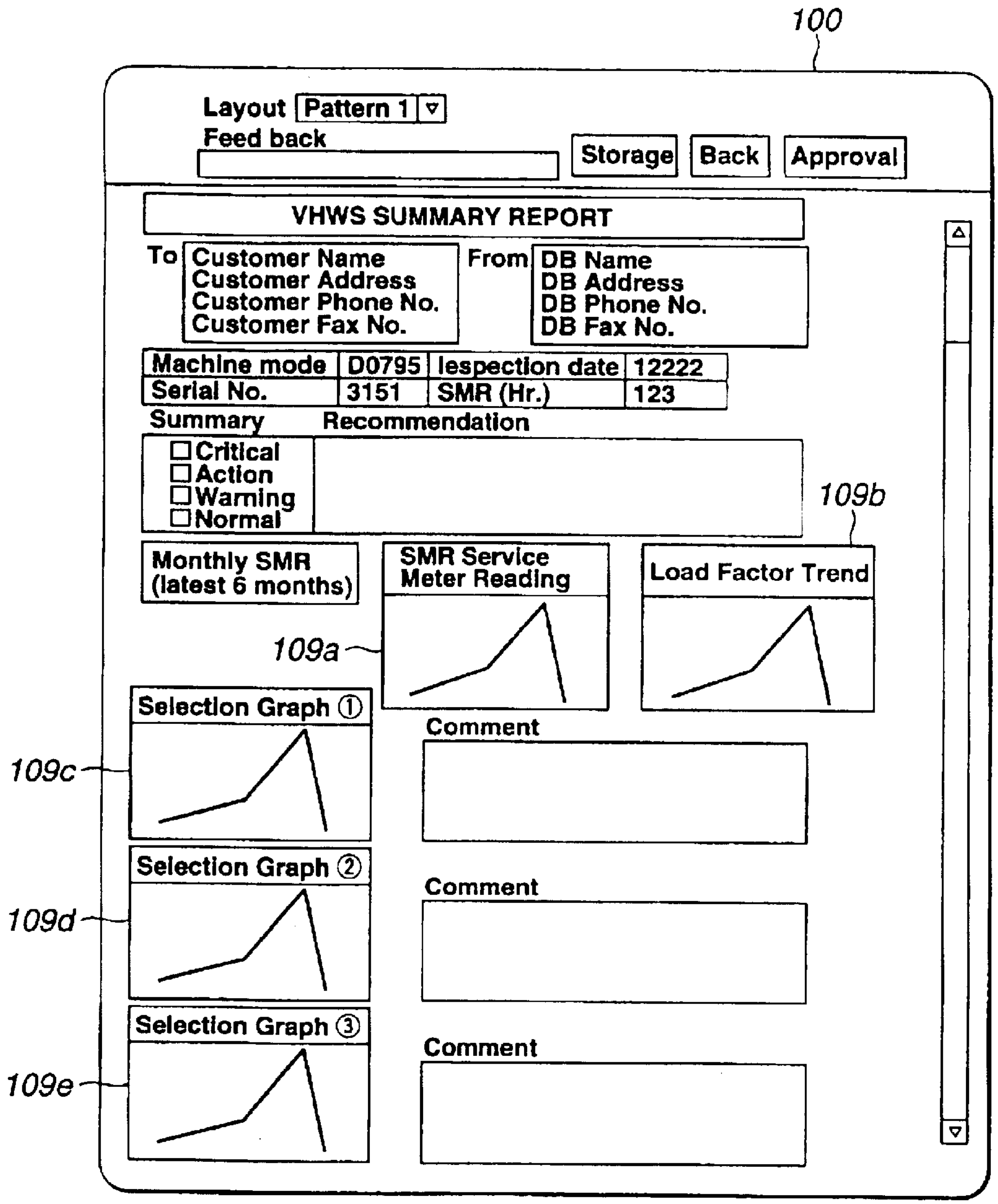
FIG. 28 is a diagram showing an example of a display screen of the terminal device.

As shown in FIG. 28, details of trend data can also be displayed on the same screen. FIG. 28 shows an example list of graphs 109*a*, 109*b*, 109*c*, 109*d*, 109*e* of trend data of the respective items on the display screen 100.

Figure 27:
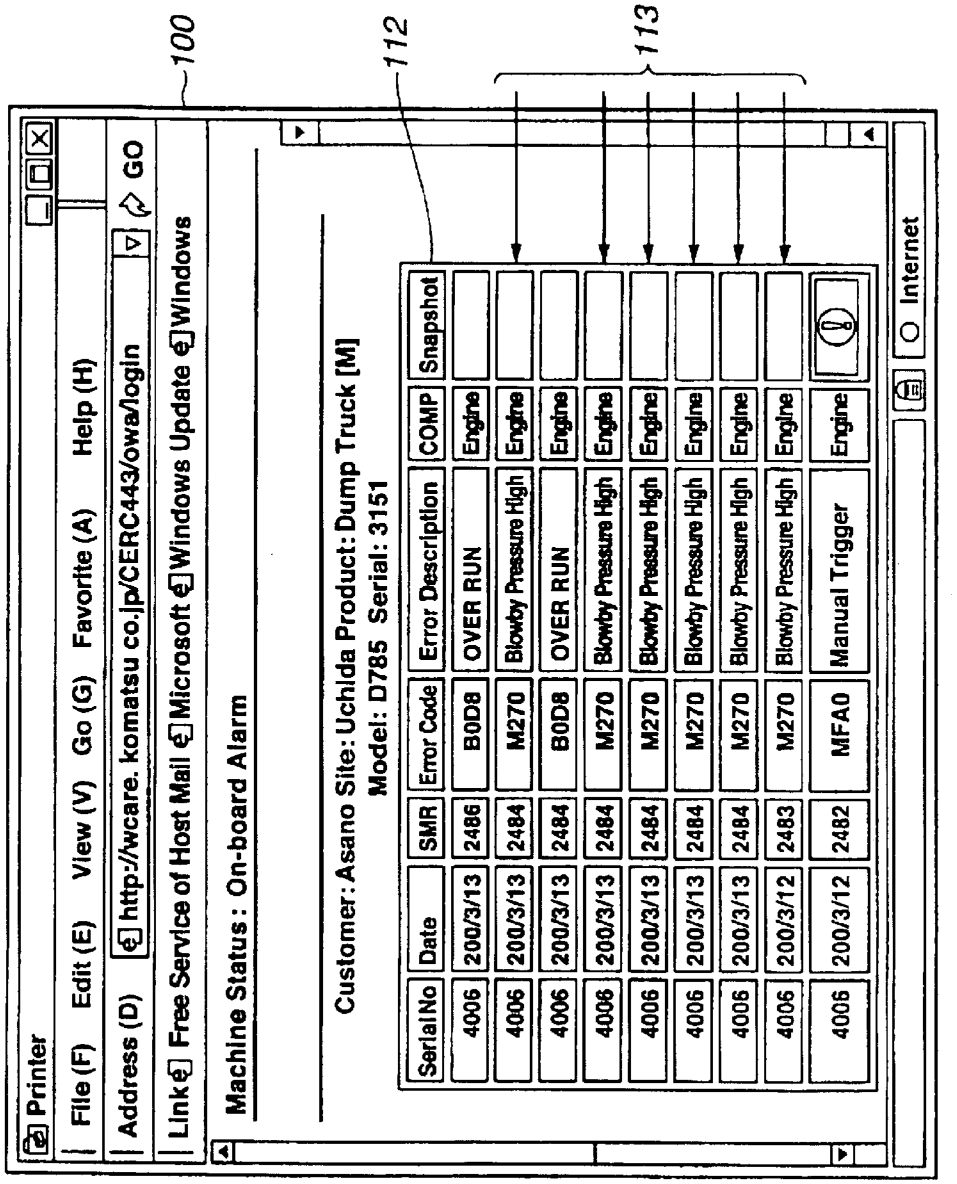
FIG. 27 is a diagram showing an example of a display screen of the terminal device.

When a predetermined point on the error code summary screen 110 is clicked, details of the corresponding error code are shown in display section 112. In other words, error code records are displayed in the display section 112 as shown in FIG. 27. For example, when display point 111 of "Error code" related to "M270 (blowby pressure high)" in the error code summary screen 110 is clicked, error code records from which "Temporary rank" of "Error code" related to "Blowby pressure high" is judged as "Rank 4" are displayed as shown in FIG. 27. It is seen that error codes related to "Blowby pressure high" indicated by arrows 113 of FIG. 27 have appeared six times in the unit time.

As described above, the maintenance person can see summary information (trend data summary information 108, error code summary information 110), detailed information (trend data graph 109, error code records 112) and abnormality information (temporary rank) taken from the onboard information D1 of a particular construction machine (model "D785", serial number "3151") on the "Report display screen" shown in FIG. 26 in.

"Temporary rank" unifying the "Temporary rank" of each item of the onboard information D1 is displayed in display section 106 of "Report display screen" of FIG. 26. The unified "Temporary rank" is automatically determined as a rank (Rank 4) with the highest abnormality degree among the "Temporary ranks" of the respective items.

Data indicating "Decision rank" can be input on the display screen 100 of FIG. 26 by clicking the display section 107. The decision rank is decided by the maintenance person from the contents of the periodical report. It may be decided by actually going to the worksite to visually check the pertinent construction machine.

When data ("Rank 3") indicating "Decision rank" is input on the display screen 100 of FIG. 26, it is sent to the server unit 11 through the Internet 17. Thus, stored data in the database 12 of the server unit 11 is rewritten. Specifically, "Decision rank" of the model "D785" with serial number "3151" in the list display 104 shown in FIG. 25 is changed from a blank state to a state with "Rank 3" entered.

FIG. 26 shows a periodical report of the onboard information D1 and also the same periodical report of the oil analysis information D2 and the inspection information D3.

Figure 29:
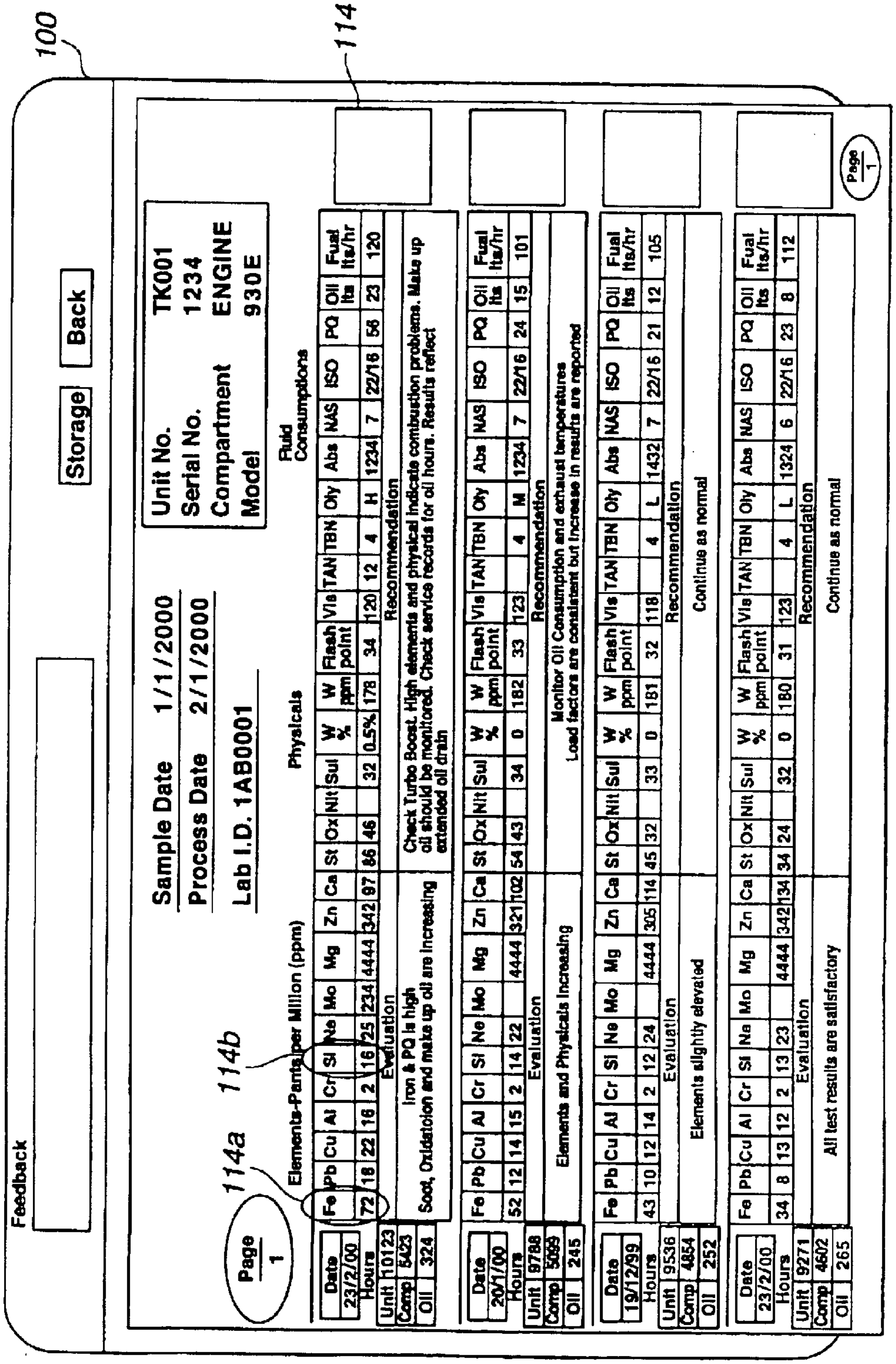
FIG. 29 is a diagram showing an example of a display screen of the terminal device.

FIG. 29 shows an example list of detailed information about each item of the oil analysis information D2 on the same screen. For example, iron Fe content "72" in the engine oil is indicated at display point 114*a* of FIG. 29, and silicon Si content "18" in the engine oil is indicated at display point 114*b*.

The display screen 100 of the terminal device 51 can also be changed to "List screen" shown in FIG. 30. As shown in FIG. 30, the "List screen" shows list display 115 which indicates the "model", "serial number", "country", "customer", "date of obtaining the latest information", "latest SMR (service meter clocking value)", "machine down", "onboard information D1", "oil analysis information D2", "inspection information D3" and "action" related to the construction machine which is administered by the agency 50. Here, the "machine down" is information indicating whether the construction machine is operating or not by a mark "○" or "X". Abnormality degrees in Rank 1, Rank 2, Rank 3 and Rank 4 are indicated by "○", "Warning", "Abnormal" and "Emergency" for "onboard information D1", "oil analysis information D2" and "inspection information D3". And, the "Action" means an action (processing of an abnormality) taken on the construction machine which is administered by the agency 50 and a step which is now pending. For example, "Waiting for parts" is indicated when the parts used to repair the construction machine are ordered but not delivered.

Figure 31:
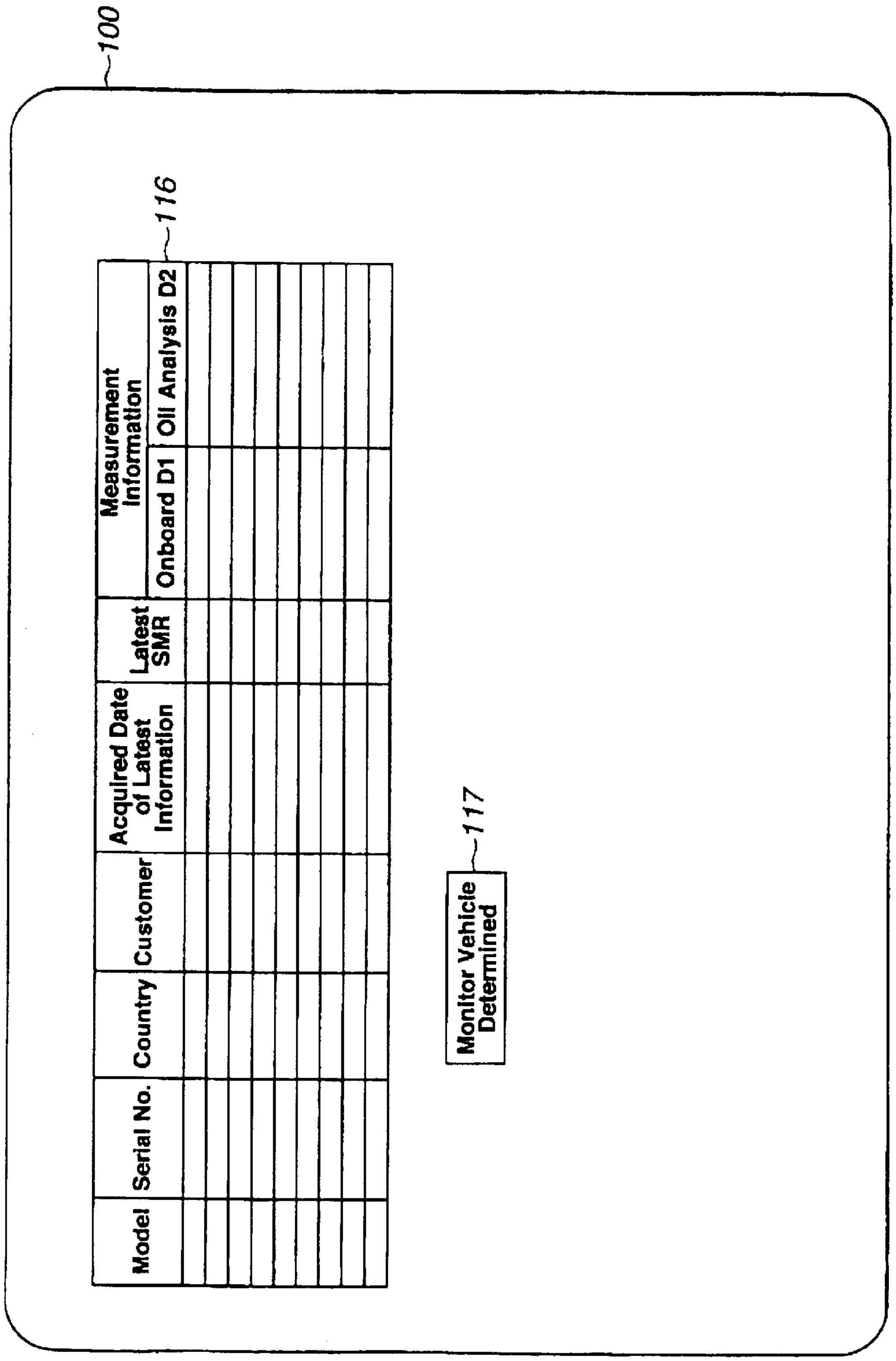
FIG. 31 is a diagram showing an example of a display screen of the terminal device.

The list display may be display 116 as shown in FIG. 31.

The terminal device 51 can make setting for addition, reduction, change, etc. of the construction machines which are administered on the display screen 100.

In order to set a construction machine, "Monitor vehicle setting" button 117 is clicked on the display screen 100 shown in FIG. 31. Then, the display screen 100 is changed to "Monitor vehicle setting screen" shown in FIG. 32.

Figure 32:
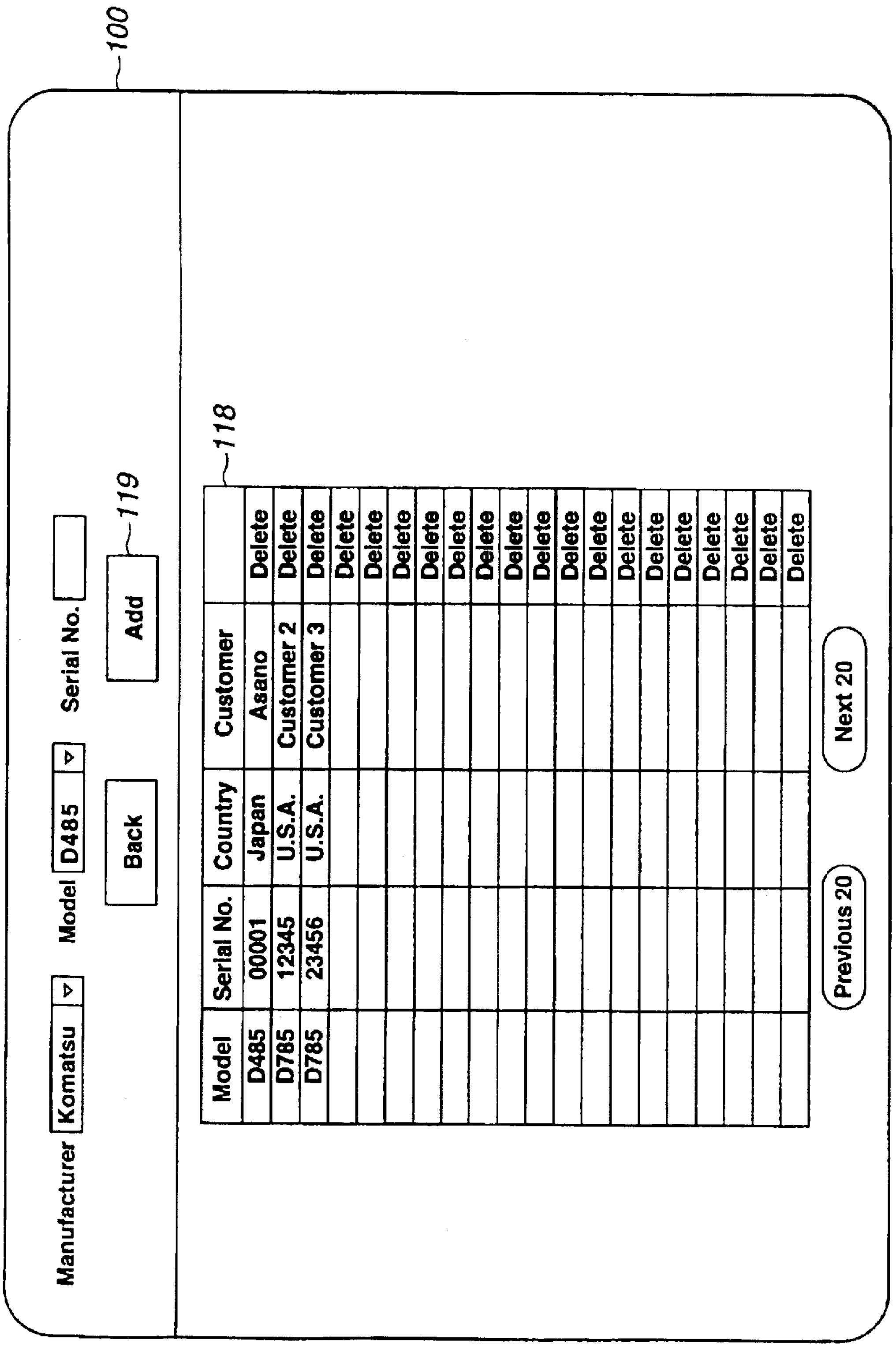
FIG. 32 is a diagram showing an example of a display screen of the terminal device.

Then, the "model", "serial number", "country" and "customer" of a newly added construction machine are entered into setting screen 118 on the "Monitor vehicle setting screen" shown in FIG. 32, and "Add" button 119 is clicked. Thus, data indicating the added construction machine is sent to the server unit 11 through the Internet 7. The stored data of the database 12 of the server unit 11 is rewritten, and the contents of the list display 116 shown in FIG. 32 are updated. The construction machines can also be deleted or changed in the same way.

The contents shown on the display screen 100 of the terminal device 51 are as described above, and the same display is also made on the display screen of another terminal device.

But, email indicating a warning is sent to the terminal device 14 of Management Division and the terminal device 16 of Sales Division of the manufacturer 10 only when a new periodical report of Rank 4 is prepared. Warnings related to all of the construction machines 31, 32, . . . manufactured by the manufacturer 10 are sent to the terminal devices 14, 16.

Email indicating a warning is sent to the terminal device 52 of Sales Division of the agency 50 only when new periodical reports of Rank 3 and Rank 4 are prepared. A warning related to only the construction machines 31, 32 administered by the agency 50 is sent to the terminal device 52.

Email indicating a warning is sent to the terminal device 53 of Management Division of the agency 50 only when a new periodical report of Rank 4 is prepared. A warning related to only the construction machines 31, 32 administered by the agency 50 is sent to the terminal device 53.

Email indicating a warning is sent to the terminal device 61 of the lease company 60 only when new periodical reports of Rank 2, Rank 3 and Rank 4 are prepared. A warning related to only the construction machine 31 administered to the terminal device 61.

Email indicating a warning is sent to the terminal device 63 of the construction company 62 only when new periodical reports of Rank 3 and Rank 4 are prepared. A warning related to only the administered construction machine 31 is sent to the terminal device 63.

Email indicating a warning is sent to the terminal device 65 of the worksite office 64 only when new periodical reports of Rank 2, Rank 3 and Rank 4 are created. And, a warning relating to only the administered construction machine 31 is sent to the terminal device 65.

Besides, the contents of information which can be accessed for each of the terminal devices can be limited in more details. For example, only summary information (trend data summary information 108, error code summary information 110) in the periodical report may be shown at the terminal devices 61, 63, 65 of the customer, while detailed information (trend data graph 109, error code historic record 112) is prevented from being displayed.

Data about the checked result "Newly created warning was read" may be input on the display screen of the terminal device, and information to be sent from the server unit 11 may be controlled depending on the result. For example, when "email check" button on the display screen of the terminal device is clinked, data indicating the checked result is sent to the server unit 11 through the Internet 7. Thus, stored data of the database 12 of the server unit 11 is updated. Therefore, the warning which was already sent as "New" as email is not sent again as a "New" warning to a particular terminal device which has sent back data about the checked result within a predetermined period. But, even if email has been sent to the particular terminal device which did not send back data about the check result within the predetermined period, email is sent again assuming that a "New" warning was created until the checked result is obtained.

The control information providing service of this embodiment can be provided with a charge. And, it may be charged online.

The server unit 11 has records of date and time when each of the terminal devices 14, 15, 16, 51, 52, 53, 61, 63, 65 has accessed to data of the database 12, a duration (login time) when communications are connected to the server unit 11 and access contents.

Then, a charge may be billed online depending on the duration of connected time. And, a charge may be billed depending on the number of times of retrieving the periodical reports.

According to the embodiment as described above, information about abnormality degrees in Ranks 1, 2, 3, 4 can be seen via the display screen 100 of the terminal device 51 of the maintenance person. Therefore, even a little abnormality belonging in the normal range can be found. And, the maintenance person can rush to the site before the actual occurrence of a failure to check the abnormality of the construction machine 31. Only information about Ranks 3, 4 of the abnormality degree can be seen via the display screen of the terminal device 52 of a sales person. Thus, only information about a serious abnormality can be seen. Information about only Rank 4 of the abnormality degree can be seen via the display screen of the terminal device 53 of the management. Thus, only information about a high possibility of a failure can be seen. Conversely, even if only information about Ranks 3, 4 indicating serious abnormality information is given to the terminal device 51 of the maintenance person, it is probable that a repair or the like cannot be made swiftly. Meanwhile, even if all information about Ranks 1, 2, 3, 4 containing information about a little abnormality are given to the terminal device 53 of the management, they are useless information, and useful information might be disregarded as a result.

Information is selectively sent from the server unit 11 to each of the terminal devices, and all information are not sent uniquely, so that a communications cost can be suppressed.

According to the embodiment, only information really useful for the administrator of the construction machines can be given, and the communications cost can be suppressed.

Communications from the construction machines 31, 32 to the server unit 11 of the embodiment are made through radio communications lines 6 by the communications satellite 5. Generally, when data communications are made via the communications satellite 5, an amount of information is limited. For example, an amount of information per communication is limited to 1 kbyte or below. Besides, there is a problem that communications charges are high. Accordingly, an embodiment that communications can be made efficiently will be described below.

A communications terminal for radio communications 6 with the communications satellite 5 is fitted to the construction machines 31, 32 of this embodiment. Generally, the engines of the construction machines 31, 32 are not operated in the night. In other words, the power switch is off.

Therefore, when a battery (rated voltage 24V) as the power supply and the communications terminal are kept connected electrically while the power switch is off and the engine is not operating, the battery is not recharged by an alternator because the engine is not operating. Therefore, the battery is discharged quickly. On the other hand, when the electrical connection between the battery and the communications terminal is kept off while the engine is off, the radio communications 6 with the communications satellite 5 is disabled. In this embodiment, when data which requests construction machine information from the controller 40 is sent from the server unit 11 via the communications satellite 5 while the engine is off, its signal triggers to forcedly activate the power circuit of the communications terminal to enable transmission of the construction machine information from the controller 40 via the communications terminal. Therefore, the construction machine information can be sent from the antenna of the communications terminal to the information requesting server unit 11 via the communications satellite 5 even in the night. Thus, useless power consumption in the night can be suppressed, and an urgent demand from the server unit 11 in the night can be met. In the night when the construction machines 31, 32 are not operating, the onboard information D1 of the construction machines 31, 32 can be collected, and a failure diagnosis is made according to the collected information. Thus, parts required for repairing can be ordered, and repairing and other works can be made efficiently without downtime.

Figure 34:
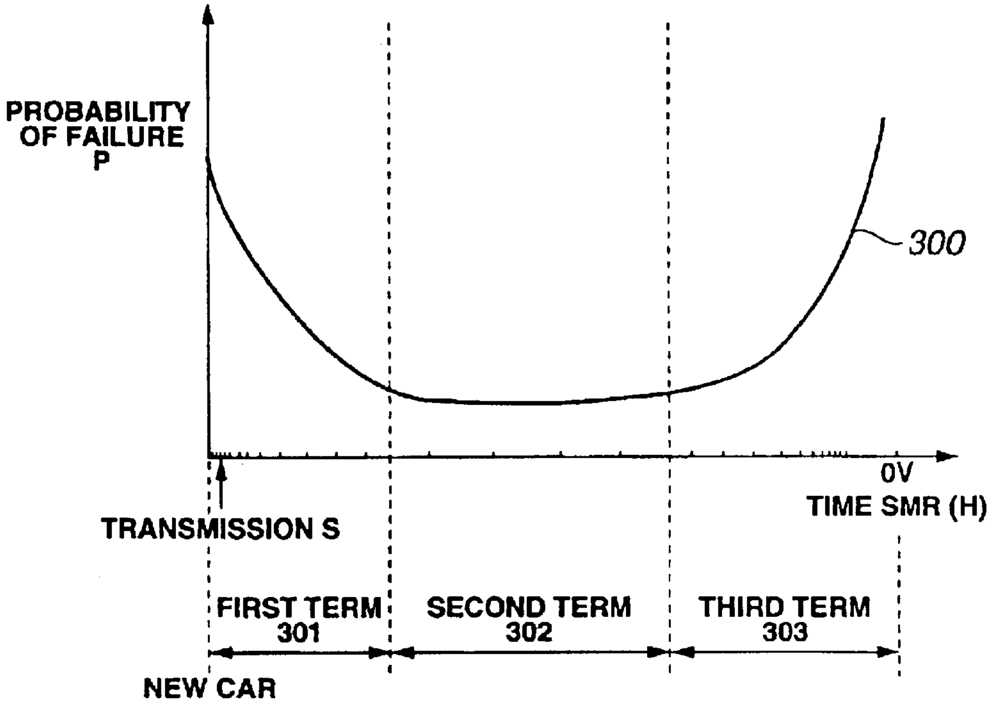
FIG. 34 is a graph showing a changing state of a failure probability of a construction machine over time.

FIG. 34 is a graph showing relation 300 between a probability of failures and a lapse of time in the construction machines 31, 32. The horizontal axis indicates a clocking value SMR (H) of the service meter and the vertical axis indicates probability P of failures in the construction machines 31, 32.

As shown in FIG. 34, the service lives of the construction machines 31, 32 are roughly divided into first term 301, second term 302 and third term 303. The first term 301 is a period from a new vehicle to a lapse of predetermined time, in which failure probability P due to a defect or the like in assembling in the factory is relatively high. But, the failure probability P becomes low as the time of using the new vehicle passes. The second term 302 is a period subsequent to the first term 301 and stable with the failure probability P low. The end of the second term 302 is 10000H for example. The third term 303 is a period subsequent to the second term 302, in which the endurance time of parts expires, and the number of failures increases with time. The end of the third term 303 is overhaul time OV (e.g., 16000H).

Troubles such as a breakdown of the construction machines 31, 32 occur easily in the period having a high failure probability P. Therefore, it is necessary to monitor the construction machines 31, 32 in the period having a high failure probability P by frequently obtaining construction machine information. Conversely, when construction machine information is frequently sent from the construction machines 31, 32 regardless of the period when the failure probability P is low, the communications cost becomes high and an advantage in monitoring is small.

Therefore, in this embodiment, the onboard information D1 is sent from the construction machines 31, 32 to the server unit 11 at long transmission intervals as the period has a smaller failure probability P.

Specifically, an interval of transmission S is made long as the failure probability P becomes smaller as shown in FIG. 34. The transmission interval may be determined for each of the first term 301, the second term 302 and the third term 303. For example, average value P1 of the failure probability P of the first term 301 can be obtained to determine transmission interval S1 with a unique size according to the average failure probability P1. Average value P2 of the failure probability P of the second term 302 is determined to determine transmission interval S2 with a unique size according to the average failure probability P2. And, average value P3 of the failure probability P of the third term 303 is determined to determine transmission interval S3 with a unique size according to the average failure probability P3. For example, the transmission interval is set to become long as S3<S1<S2 in order of the third term 303, the first term 301 and the second term 302.

When the onboard information D1 is periodically sent from the construction machines 31, 32 to the server unit 11 via the communications satellite 5 at the aforesaid transmission intervals, a trouble such as a failure of the construction machines 31, 32 can be diagnosed early and accurately. And, the communications cost can be suppressed.

And, when the period has a small failure possibility P, information with a small number of items may be sent from the construction machines 31, 32 to the server unit 11. For example, in the second term 302 with a low failure possibility P, only trend data of major items in the onboard information D1 is sent, and in the third term 303 with a high failure possibility P, trend data of all items in the onboard information D1 are sent, and load frequency map data is also sent. Thus, a trouble such as a failure can be disposed more accurately and the communications cost can be suppressed.

Then, an embodiment to make failure diagnosis efficiently in combination with various types of communications forms will be described.

The communications forms to obtain construction machine information of the side of the construction machines 31, 32 by the server unit 11 are as follows.

(1) Periodical transmission from the construction machines 31, 32 (transmission at the transmission intervals shown in FIG. 34).
(2) Transmission of construction machine information to the server unit 11 by activating the communications terminals of the construction machines 31, 32 in response to the request from the server unit 11.
(3) Transmission through the Internet 7 by downloading construction machine information by the portable terminal device 19.

In the onboard information D1, trend data and error code can be sent by the aforesaid communications form (1), and frequency map data in the onboard information D1 can be sent by the aforesaid communications form (2).

And, only trend data in the onboard information D1 is sent by the aforesaid communications form (1), and error code, snap shot data and frequency map data in the onboard information D1 may be sent by the aforesaid communications form (3). When data is sent to the server unit 11 by the above communications form 3, the inspection information D3 can also be sent in addition to the onboard information D1.

In the aforesaid embodiment, the abnormality degree of the construction machines 31, 32 is ranked in each level of Rank 1 (Normal), Rank 2 (Warning), Rank 3 (Abnormal) and Rank 4 (Emergency) by the server unit 11. And, the administrator of the construction machines 31, 32 makes a check, repair or the like of the construction machines 31, 32 on the basis of information indicating the ranked abnormality degree.

But, ranking by the server unit 11 is automatically made on the basis of the predetermined data, so that if data required for judging is insufficient or the contents of data are not along the actual situation, ranking may be determined to be higher or lower than the actual level.

On the other hand, the administering sides have different special knowledge and technological levels to administer the construction machines 31, 32. For example, designers of the manufacturer have good technical knowledge of the construction machines, while users such as rental companies generally do not have good technical knowledge of the construction machines.

Therefore, when the ranked results in the server unit 11 are sent as they are to the designers of the manufacturer and the users, the designers of the manufacturer finally judge on the basis of their knowledge whether the ranked results are appropriate or not and can take proper measures. Meanwhile, because the users do not have good technical knowledge, they have to trust the ranks made by the server unit 11. If the ranked level is higher than the actual level, useless efforts are expended. And, if the ranked level is lower than the actual level, appropriate processing such as repairing is delayed, and a trouble may be caused.

In the following embodiment, ranking information is given according to the technical level of the side administering the construction machines 31, 32, so that appropriate measures can be taken.

The construction machine such as a dump truck is often used at the same worksite. The construction machines operating in the same environment may have a trouble that the sensor value reaches an abnormal value and error codes are generated all together if the environment changes suddenly, e.g., an outside temperature increases sharply. Therefore, a change caused in all the construction machines due to a sudden change in the environment is judged abnormal, and the judgment may not be consistent with the actual situation.

Conversely, when a standard of generation of an error code is set high in order to exclude a sudden change in the environment, actual generation of an abnormality is not detected beforehand, and a repair must be made after the construction machine suffers a breakdown, and downtime might become huge.

Accordingly, in the following embodiment, information collected from a plurality of construction machines operating in the same environment are compared to enable correct judgment whether an abnormality results from the environment or an actual abnormality in the construction machine.

Specifically, specialist's terminal device 10*a* is disposed in the manufacturer head office 10 in FIG. 1. The specialist's terminal device 10*a* is disposed in Design Division of the manufacturer. It is assumed that designers of Design Division of the manufacturer have expert knowledge about the construction machines 31, 32 and can finally judge whether the judgment of abnormality degree ranking made by the server unit 11 is appropriate or not on the basis of their expert knowledge.

The expert's terminal device 10*a* is connected to the intranet 13 in the same way as the other terminal devices 14, 15, 16.

The expert's terminal device 10*a* reviews the ranked results related to the onboard information D1, the oil analysis information D2 and the inspection information D3 made by the server unit 11 or the ranked results obtained according to any two or all of the information D1, D2, D3.

The operation of the embodiment will be described with reference to the onboard information D1.

When the onboard information D1 is ranked its abnormality degree by the server unit 11, all the ranked results are sent from the server unit 11 to the expert's terminal device 10*a*.

The expert's terminal device 10*a* makes reranking of the sent ranking.

A criterion of the "reranking" will be described below.

The onboard information D1 is assumed to be a blowby pressure for example. It is assumed that the construction machine 31 is a dump truck and a plurality of dump trucks 31 are operating at the same worksite. Reference numerals 31*a*, 31*b*, 31*c* are allotted to the respective dump trucks.

Figure 35A:
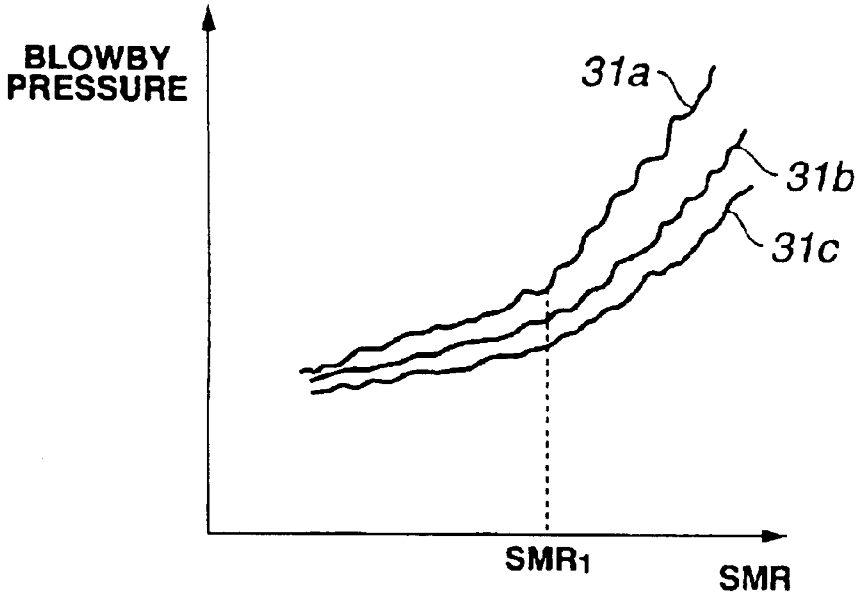
FIGS. 35(*a*) and 35(*b*) are graphs comparing data of a plurality of construction machines operating in the same environment.
Figure 35B:
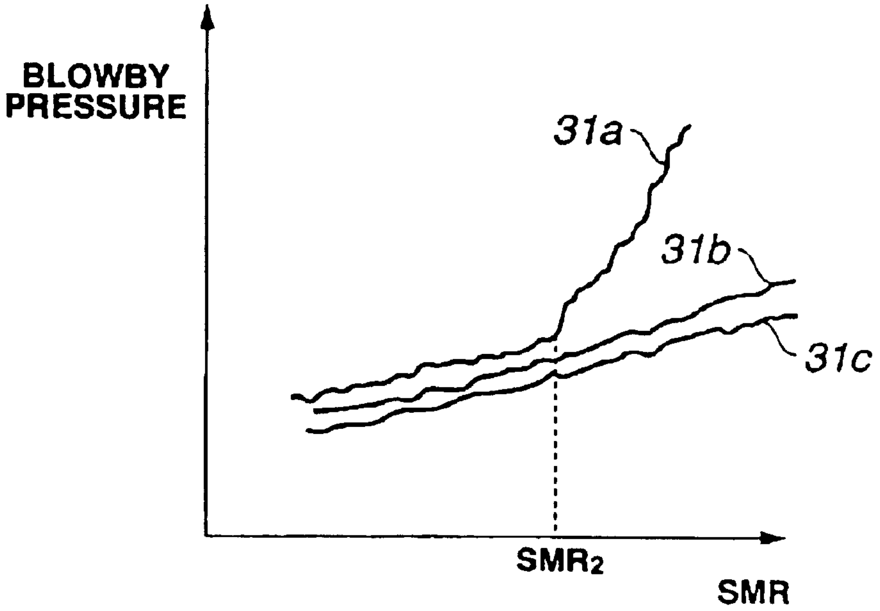

FIGS. 35(*a*) and 35(*b*) show trend data about blowby pressures of the respective dump trucks 31*a*, 31*b*, 31*c*. The horizontal axis of FIG. 35(*a*) is service meter clocking value SMR, and the vertical axis is the sensor-detected values of blowby pressures.

As shown in FIG. 35(*a*), the trend data of the dump truck 31*a* increases sharply from the service meter value SMR1. Therefore, according to the "judging method based on a gradation of trend data" described with reference to FIG. 3(*b*), the sharp increase from the service meter value SMR1 is caught and it is judged by the server unit 11 that the dump truck 31*a* is "abnormal". It is assumed in this case that ranking of the abnormality degree is Rank 4 (Emergency).

But, trend data of the other dump trucks 31*b*, 31*c* shows that the "sharp increase from the service meter value SMR1" has the same tendency as the dump truck 31*a*.

Therefore, it is judged that the abnormality of the dump truck 31*a* results from a change in the worksite environment and does not have a strong possibility that the abnormality is inherent in the dump truck 31*a*. It is finally judged that the abnormality of Rank 4 has not occurred, and ranking is changed from "4 (Emergency)" to "3 (Abnormal)".

Conversely, as shown in FIG. 35(*b*), when only trend data about a single dump truck 31*a* shows a tendency to sharply increase from the service meter value SMR1 and the other dump trucks 31*b*, 31*c* do not show a tendency to increase sharply, it is judged that the abnormality of the dump truck 31*a* has a high possibility of being peculiar to the dump truck 31*a*. Finally, it is judged that the abnormality of Rank 4 has occurred, and ranking "4 (Emergency)" made by the server unit 11 is maintained.

A position detection sensor such as a GPS sensor is fitted to the respective dump trucks 31*a*, 31*b*, 31*c* and the detected result by each position detection sensor is sent to the expert terminal device 10*a* via the server unit 11, so that it can be judged that the multiple dump trucks 31*a*, 31*b*, 31*c* are operating at the same worksite.

It is assumed in FIGS. 35(*a*) and 35(*b*) that data of the multiple dump trucks 31*a*, 31*b*, 31*c* operating at the same worksite (same area, same position) are compared. But, data of the construction machines having the same external factors such as an outside temperature and humidity may be compared. In addition to the external factors, the construction machines of the same model and type may be compared.

The reranking criterion of "comparing data of the construction machines operating in the same environment" was described above. But, as another criterion, data related to the blowby pressure which is used to judge the abnormality may be considered to review the ranking.

For example, ranking can be reviewed by considering the engine speed and the engine output torque related to the blowby pressure. Even if the blowby pressures had the same value, ranking tends to indicate a higher level when the engine speed is high, but ranking tends to indicate a low level when the engine speed is low. And, when a load is applied, ranking tends to indicate a higher level, and when a load is not applied such as "idling of the engine", ranking tends to be low. The same tendency is applied to ranking of the exhaust temperature. When an outside temperature is high, ranking tends to be high, but when it is low, ranking tends to be low.

Thus, data after reranking is sent from the expert's terminal device 10*a* to the server unit 11 and stored in the database 12 of the server unit 11.

Then, in response to the request from each of the respective terminal devices 14, 15, 16, 18, 19, 51, 52, 53, 61, 63, 65, reranked data is sent to the requested terminal device. Specifically, when the stored data of the database 12 is accessed by the respective terminal devices, a Web page is shown on the display screen of the terminal device to show the reranked result. Abnormality information of a particular rank allotted to the respective terminal devices is automatically sent as email from the server unit 11 to the respective terminal devices.

For example, it is assumed that data which was reranked from Rank "4" to Rank "3" is sent to the terminal device 61 of the lease/rental company 60 as a user of the construction machines 31, 32. In this case, measures such as dispatch of a maintenance person can be avoided, and a useless labor is reduced.

Conversely, it is assumed that data reranked from Rank "3" to Rank "4" is sent to the terminal device 61 of the lease/rental company 60 as a user of the construction machines 31, 32. In this case, it is possible to take measures such as an urgent dispatch of a maintenance person to take appropriate steps to make repair quickly, so that the occurrence of downtime due to a failure of the construction machine can be avoided.

The aforesaid embodiment sends the ranked result by the server unit 11 from the server unit 11 to the expert's terminal device 10*a*, and when an expert is on the side of the server unit 11, the ranked result can be reviewed by the server unit 11. In this case, reranking is made by the expert on the side of the server unit 11, the reranked data is input through input means such as a keyboard and stored in the database 12. Subsequently, the reranked data is sent to the respective terminal devices in the same way.

In the aforesaid description, data of the same rank reranked is sent to the respective terminal devices 14, 15, 16, 18, 19, 51, 52, 53, 61, 63, 65, but the ranks to be sent may be varied depending on the level of the terminal device.

For example, it is assumed that ranking of the abnormality degree is judged to be "4 (Emergency)" by the server unit 11. In this case, when ranking "4 (Emergency)" is sent as it is to the terminal device 51 of Maintenance Division and the terminal device 61 of the user lease/rental company 60, a maintenance person rushes to the site, and the user stops the work. Therefore, a useless labor and high downtime are generated.

According to the aforesaid embodiment, when it is judged by an expert that the ranking "4 (Emergency)" is actually "3 (Abnormal)", its reranked data is sent to the terminal device 51 of Maintenance Division and the terminal device 61 of the lease/rental company 60. Thus, the maintenance person periodically makes the rounds of inspection, the user operates the construction machines carefully, and appropriate measures can be taken depending on the actual condition.

In this embodiment, when it is judged by an expert that ranking "4 (Emergency)" is actually "3 (Abnormal)", data of reranked one, namely "3 (Abnormal)", is sent to the terminal device 61 of the lease/rental company 60, and data before reranking, namely "4 (Emergency)", is sent as it is to the terminal device 51 of Maintenance Division.

Thus, the maintenance person can rush to the site, and the user can operate the construction machines carefully. Therefore, the construction machines can be operated until the maintenance person arrives, so that downtime can be minimized. And, the maintenance person rushes to the site to check whether the judgment made by the expert is correct or not, and can report the result to the manufacturer. According to the embodiment, more appropriate measures can be taken as compared with a case that the reranked result is uniquely sent to the respective terminal devices.

What is claimed is:

1. A control system for a construction machine which collects information from the construction machine, judges an abnormality of the construction machine on the basis of the collected construction machine information, and processes the abnormality of the construction machine when it is judged abnormal to control the construction machine, comprising:

information collecting means which detects or measures the construction machine information; and information processing means which compares a detected value or a measured value detected or measured by the information collected means with threshold values for each of a plurality of ranks and ranks an abnormality degree of the construction machine indicated by the detected value or the measured value in a plurality of levels, wherein:

the abnormality of the construction machine is processed on the basis of information indicating the abnormality degree ranked by the information processing means.

2. The control system for a construction machine according to claim 1, wherein:

the system is applied to control a plurality of construction machines, and the information processing means set a ranking criterion for each of the construction machines and ranks for every construction machine according to the set criterion.

3. The control system for a construction machine according to claim 1, wherein:

the construction machine information is time-series data which is variable with the passage of time, and the information processing means ranks an amount of change to an inclination, an absolute value or an initial value of the time-series data in a plurality of levels.

4. The control system for a construction machine according to claim 1, wherein:

the construction machine information is an error code indicating an error occurred within the construction machine, and the information processing means ranks a frequency of occurrence of the error code in a plurality of levels.

5. The control system for a construction machine according to claim 1, wherein:

the construction machine information is a compared result obtained by comparing an actual operating condition with a predicted value of an operating state of the construction machine, and the information processing means ranks the compared result in a plurality of levels.

6. A control system for a construction machine which collects information from the construction machine, judges an abnormality of the construction machine on the basis of the collected construction machine information, and processes the abnormality of the construction machine when it is judged abnormal to control the construction machine, comprising:

information collecting means which detects or measures the construction machine information; and a single or plurality of terminal devices which are disposed on the side of an administrator who processes the abnormality of the construction machine, wherein:

the information collecting means, the terminal devices, and a server unit are communicably connected by communications means;

information processing means which compares a detected value or a measured value detected or measured by the information collecting means with threshold values for each of a plurality of ranks and ranks an abnormality degree indicated by the detected value or the measured value in a plurality of levels;

the construction machine information collected by the information collecting means is sent to the server unit through the communications means;

the information processing means of the server unit ranks the abnormality degree of the construction machine in a plurality of levels on the basis of the sent construction machine information; and the server unit responds to a request from the single or plurality of terminal devices and sends information indicating the ranked abnormality degree to the requested terminal device through the communications means.

7. The control system for a construction machine according to claim 6, wherein:

the system is applied to control a plurality of construction machines, and the information processing means set a ranking criterion for each of the construction machines and ranks for every construction machine according to the set criterion.

8. The control system for a construction machine according to claim 6, wherein:

the construction machine information is time-series data which is variable with the passage of time, and the information processing means ranks an amount of change to an inclination, an absolute value or an initial value of the time-series data in a plurality of levels.

9. The control system for a construction machine according to claim 6, wherein:

the construction machine information is an error code indicating an error occurred within the construction machine, and the information processing means ranks a frequency of occurrence of the error code in a plurality of levels.

10. The control system for a construction machine according to claim 6, wherein:

the construction machine information is a compared result obtained by comparing an actual operating condition with a predicted value of an operating state of the construction machine, and the information processing means ranks the compared result in a plurality of levels.

11. A control system for a construction machine which collects information from the construction machine, judges an abnormality of the construction machine on the basis of the collected construction machine information, and processes the abnormality of the construction machine when it is judged abnormal to control the construction machine, comprising:

information collecting means which detects or measures the construction machine information; and a plurality of terminal devices which are disposed on the side of an administrator who processes the abnormality of the construction machine, wherein:

the information collecting means, the plurality of terminal devices and a server unit are communicably connected by communications means;

information processing means, which compares a detected value or a measured value detected or measured by the information collecting means with threshold values for each of a plurality of ranks and ranks an abnormality degree of the construction machine indicated by the detected value or the measured value in a plurality of levels and associates a rank of the abnormality degree to be sent with the plurality of terminal devices, is disposed on the server unit;

the construction machine information collected by the information collecting means is sent to the server unit through the communications means;

the information processing means of the server unit ranks the abnormality degree of the construction machine in a plurality of levels on the basis of the sent construction machine information and associates a rank of the abnormality degree to be sent with the plurality of terminal devices; and the server unit responds to a request from the terminal device and sends abnormality degree information of a corresponding rank to the requested terminal device through the communications means.

12. A control system for a construction machine which collects information from the construction machine, judges an abnormality of the construction machine on the basis of the collected construction machine information, and processes the abnormality of the construction machine when it is judged abnormal to control the construction machine, comprising:

information collecting means which detects or measures the construction machine information; and a plurality of terminal devices which are disposed on the side of an administrator who processes the abnormality of the construction machine, wherein:

the information collecting means, the terminal devices and a server unit are communicably connected by communications means;

the server unit is provided with information processing means which compares a detected value or a measured value detected or measured by the information collecting means with threshold values for each of a plurality of ranks and ranks an abnormality degree of the construction machine indicated by the detected value or the measured value in a plurality of levels and stores the ranked results in a storage means;

the construction machine information collected by the information collecting means is sent to the server unit through the communications means;

the information processing means of the server unit ranks the abnormality degree of the construction machine in a plurality of levels on the basis of the sent construction machine information;

the ranks of the abnormality degree made by the information processing means are reranked, and the reranked results are stored in the storage means; and the server unit sends information indicating the reranked abnormality degree to the respective terminal devices through the communications means.

13. The control system for a construction machine according to claim 12, wherein:

the plurality of terminal devices are ranked in a plurality of levels;

the abnormality degree ranked by the information processing means of the server unit is reranked according to the levels of the terminal devices; and the server unit sends the information about the reranked abnormality degree according to the levels of the terminal devices to the corresponding terminal device through the communications means.

14. A control system for a construction machine which collects information from the construction machine, judges an abnormality of the construction machine on the basis of the collected construction machine information, and processes the abnormality of the construction machine when it is judged abnormal to control the construction machine, comprising:

information collecting means which collect the construction machine information; and a plurality of terminal devices which are disposed on the side of an administrator who processes the abnormality of the construction machine, wherein:

the information collecting means, the terminal devices and a server unit are communicably connected by communications means;

the server unit is provided with information processing means which ranks an abnormality degree in a plurality of levels on the basis of the construction machine information;

the construction machine information collected by the information collecting means is sent to the server unit through the communications means;

the information processing means of the server unit ranks the abnormality degree of the construction machine in a plurality of levels on the basis of the sent construction machine information;

the server unit sends information indicating the ranked abnormality degree to a particular terminal device through the communications means;

the particular terminal device reranks the ranked abnormality degree for the sent information and sends to the server unit; and the server unit sends information indicating the reranked abnormality degree to the respective terminal devices through the communications means.

15. The control system for a construction machine according to claim 14, wherein:

the plurality of terminal devices are ranked in a plurality of levels;

the abnormality degree ranked by the information processing means of the server unit is reranked according to the levels of the terminal devices; and the server unit sends the information about the reranked abnormality degree according to the levels of the terminal devices to the corresponding terminal device through the communications means.

* * * * *